US008887132B1

(12) United States Patent
Hunter

(10) Patent No.: US 8,887,132 B1
(45) Date of Patent: Nov. 11, 2014

(54) APPLICATION RUNTIME ENVIRONMENT AND FRAMEWORK

(76) Inventor: Christopher R. Hunter, Bozeman, MT (US)

( * ) Notice: Subject to any disclaimer, the term of this patent is extended or adjusted under 35 U.S.C. 154(b) by 201 days.

(21) Appl. No.: 13/199,660

(22) Filed: Sep. 6, 2011

Related U.S. Application Data

(60) Provisional application No. 61/402,726, filed on Sep. 3, 2010.

(51) Int. Cl.
*G06F 9/44* (2006.01)
(52) U.S. Cl.
USPC ............................ 717/111; 717/112; 717/117
(58) Field of Classification Search
CPC ............... G06F 8/30; G06F 8/33; G06F 8/36; G06F 8/71
USPC ................. 717/100–111, 124–148, 162–165; 719/315–332; 709/203; 703/13, 23, 26
See application file for complete search history.

(56) References Cited

U.S. PATENT DOCUMENTS

| 7,155,676 | B2 | 12/2006 | Land et al. | |
| 7,650,390 | B2 * | 1/2010 | Arner et al. | 709/217 |
| 2002/0100027 | A1 * | 7/2002 | Binding et al. | 717/137 |
| 2007/0011650 | A1 * | 1/2007 | Hage et al. | 717/104 |
| 2009/0172101 | A1 * | 7/2009 | Arthursson | 709/205 |
| 2010/0180284 | A1 * | 7/2010 | Ross | 719/330 |

OTHER PUBLICATIONS

Douglas et al., An object-oriented framework for dynamically configuring extensible 1 distributed systems, Distrib. Syst. Engng 1 (1994), pp. 280-293. Printed in the UK.*
Raghavachari et al., The Deployer's Problem: Configuring Application Servers for Performance and Reliability, IEEE, 2003, pp. 484-489.*
Baiter et al., Architecturing and Configuring Distributed Application with Olan, Middleware'98 Springer-Verlag London Limited 1998, pp. 241-256.*

* cited by examiner

*Primary Examiner* — Satish Rampuria
(74) *Attorney, Agent, or Firm* — Robert M. Hunter

(57) ABSTRACT

A system and method for supporting the development and instantiation of web and locally installed interactive software applications that are configurable through editing and processing of formatted XML files originating through programmed or manual means. Software applications load and instantiate native applications embedded within in combination with core framework/runtime supported components. The application runtime environment and framework has the ability to implement runtime-configurable design templates to facilitate object reuse. This, in combination with de-coupled integration with custom data sets and services in addition to support for dynamic layout calculations make for efficient development and maintenance of applications.

28 Claims, 29 Drawing Sheets

Embedded (E) Object (XML Driven Display Object Container)

Formatted XML Configuration File (Data or Display Object Container)

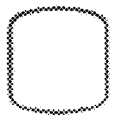

Display Object Reference Within E XML

Data Collection File Reference Within E XML

Window Object (Display Object Container Transitioner)

Loaded From Internet On Cloud Service

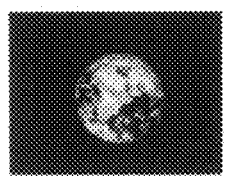

Application Including Publish Using Record and Recordset, AlbumsModel And PhotosModel Or Similar Classes

FIG. 2

Data and Template File References
Produced On Record Set Publish
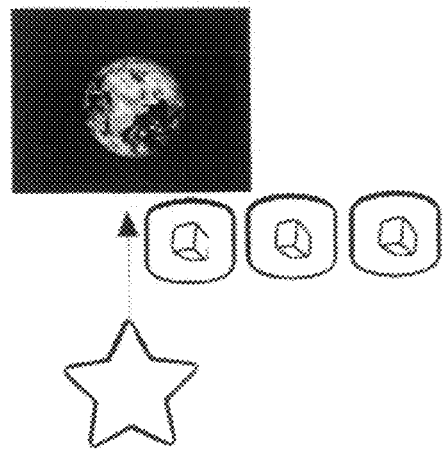
= ("stack" publish)
OR ("pair" publish)
OR ("slider" image button collection publish)
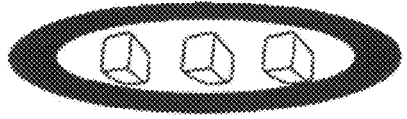
OR ("list box" publish within form)
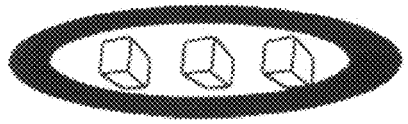
FIG. 7

```
<rox>
  <element type="rectangle" x="-10" y="10" width="AUTO" auto_width_id="this"
  auto_width_adjust="100" height="AUTO" auto_height_id="this"
  auto_height_adjust="40" border_line_size="10" border_line_color="dddddd"
  border_line_alpha="1" border_fill_size="10" border_fill_color="111111"
  border_fill_alpha="0.2" />
  <element type="text" text="Hello World" x="60" y="26"
  font="_Century_Gothic_Bold" size="50" color="999999" />
  <element type="window" id="example" x="0" y="0">
    <child type="rox" id="sydney" window_id="example" cfg="sydney.rox" x="0"
y="0" />
  </element>
  <element type="text" sub_type="button" text="  Sydney  " url="WINDOW"
  font="_Century_Gothic_Bold" size="14" x="120" y="90" color_up="999999"
  color_over="666666" color_down="aaaaaa" border_line_size="2"
  border_line_color="666666" border_line_alpha="1" border_fill_color="101729"
  border_fill_alpha="0.8" corner_radius="10">
    <child type="rox" id="sydney" window_id="example" cfg="sydney.rox" x="0"
y="0" />
  </element>
  <element type="text" sub_type="button" text="  Hong Kong  " url="WINDOW"
  font="_Century_Gothic_Bold" size="14" x="230" y="90" color_up="999999"
  color_over="666666" color_down="aaaaaa" border_line_size="2"
  border_line_color="666666" border_line_alpha="1" border_fill_color="101729"
  border_fill_alpha="0.8" corner_radius="10">
    <child type="rox" id="hongKong" window_id="example" cfg="hong_kong.rox"
x="0" y="0" />
  </element>
</rox>
```

FIG. 8A sydney.rox:

```
<rox>
  <element type="image" name=" Sydney.jpg" center_x="390" center_y="326" max_width="400" max_height="400" top_stretch="30" left_stretch="130" right_stretch="130" border_line_size="2" border_line_color="999999" border_line_alpha="1" border_fill_size="20" border_fill_color="111111" border_fill_alpha="0.6" corner_radius="10" />
  <element type="text" text="_CDATA" x="200" y="142" width="400" height="60" >
    <![CDATA[<h1>Hong Kong:</h1> <h2>View From The Peak</h2>]]>
  </element>
</rox>
```

FIG. 8B

File Representation of display object container - E

*Tag Attributes:*
reference (within display object container file):
- type="rox"
- id
- window_id
- cfg
- x (can be "AUTO")
- auto_x_id  (only used when x is AUTO)
- auto_x_adjust (only used when x is AUTO)
- y (can be AUTO)
- auto_y_id  (only used when y is AUTO)
- auto_y_adjust (only used when y is AUTO)
- page
- scale

*Example(s):* reference:
```
<element type="rox"
    cfg="left_bar.rox"
    x="16"
    y="100"/>
``` xml representation (file per E, with above reference contained within):
```
<rox>
    <element type="rox"
        cfg="left_bar.rox"
        x="16"
        y="100"/>
</rox>
``` xml representation (file per E, with above reference as window child for button link):
```
<rox>
    <element type="image"
        sub_type="button"
        url="WINDOW"
        name="@name">
      <child type="rox"
          id="@name"
          window_id="full_screen"
          cfg="full_screen_image_template.rox"
          x="0"
          y="0"/>
    </element>
</rox>
```

FIG. 9A

Window (Display Object Container)

*Tag Attributes:*
- type="window"
- id
- x (use for e)
- y (use for e)
- center_x (only use when linking to image or image button - e has x,y)
- center_y (only use when linking to image or image button - e has x,y)
- max_width
- max_height
- transition_type (default is "alpha")

*Child Attributes:*
- type ("image" or "rox")
- sub_type (potentially "button" only when type is "image")
- id
- page ()
- cfg
- name
- x
- y
- scale

*Example(s):* general case - element:
```
<element type="window"
         id="full_screen"
         center_x="410"
         center_y="346"
         max_width="400"
         max_height="400">
    <element id="blank" />
</element>
``` window collection for index based on "page" (implements page level links):
```
<collection type="window" id="site_main">
 <child page="home" type="rox" cfg="home.rox" id="home" />
 <child page="artist_statement" type="rox" cfg="common.rox" id="artist_statement" />
 <child page="biography" type="rox" cfg="common.rox" id="biography" />
 <child page="artwork" type="rox" cfg="common.rox" id="artwork" />
 <child page="search_results" type="rox" cfg="common.rox" id="search_results" />
 <child page="comission_artwork" type="rox" cfg="common.rox" id="comission_artwork" />
 <child page="purchase_artwork" type="rox" cfg="common.rox" id="purchase_artwork" />
 <child page="art_purchasing_information" type="rox" cfg="common.rox" id="art_purchasing_information" />
 <child page="inquiries" type="rox" cfg="common.rox" id="inquiries" />
 <child page="artwork_category_one" type="rox" cfg="artwork_category_one.rox" id="artwork_category_one"
/>
</collection>
```

FIG. 9B

Image (Static, Background and Image Button) (Display Object)

*Tag Attributes:*
- type="image"
- sub_type="background" (background only)
- id (if child for window link)
- name (file name)
- x (can be "AUTO")
- auto_x_id (only used when x is AUTO)
- auto_x_adjust (only used when x is AUTO)
- y (can be AUTO)
- auto_y_id (only used when y is AUTO)
- auto_y_adjust (only used when y is AUTO)
- width (basic)
- height (basic)

*Child Attributes (only used for image buttons and when URL is "WINDOW"):*
- type ("image" or "rox")
- sub_type (potentially "button" only when type is "image")
- id
- cfg (only when type is "rox")
- name (only when type is "image")
- x (only when type is "rox")
- y (only when type is "rox")
- scale

*Example(s):*

BASIC:
```
<element type="image"
    name="whh.gif"
    x="18"
    y="220"
    width="100"
    height="200" />
```

BACKGROUND:
```
<element type="image"
    sub_type="background"
    name="pagebg.gif" />
```

USE WITHIN WINDOW FOR CENTER X/Y & TRANSITION EFFECT:
* INCLUDES BORDER/BG RECT, D] e WINDOW LINK BASED ON DATA
```
<element type="window"
    id="center"
    center_x="410"
    center_y="346"
    max_width="400"
    max_height="400"
    border_line_size="2"
    border_line_color="dddddd"
    border_line_alpha="0.2"
    border_fill_size="10"
    border_fill_color="111111"
    border_fill_alpha="0"
    corner_radius="0">
<child type="image"
    sub_type="button"
    url="WINDOW"
    name="@name">
<child type="rox"
    id="@name"
    window_id="full_screen"
    cfg="full_screen_image_template.rox"
    x="0"
    y="0" />
</child>
</element>
```

FIG. 9C

Image and Image Button Collection (Display Objects)

*Tag Attributes:*
- type="image"
- id (if using window)
- name
- x (basic)
- y (basic)
- width (basic)
- height (basic)
- border_line_color
- border_line_alpha
- border_fill_color
- border_fill_alpha

*Child Attributes (only used for image buttons and when URL is "WINDOW" ):*
- type ("image" or "rox")
- sub_type (potentially "button" only when type is "image")
- id
- cfg (only when type is "rox")
- name (only when type is "image")
- x (only when type is "rox")
- y (only when type is "rox")
- scale

*Example(s):*

```
// image button collection - image button collection (stagger, slider)
    Stagger
        basic:
         <collection type="image"
                sub_type="button"
                stagger_mode="DYNAMIC"
                toggle_type="NO_BORDER"
                bottom_stretch="30"
                x="100"
                y="420"
                width="100"
                height="100"
                xDistance="240"
                toggle_max="10"
                border_line_size="2"
                border_line_color="cccccc"
                border_line_alpha="0.1"
                border_fill_size="18"
                border_fill_color="ffffff"
                border_fill_alpha="0.1">
            <child type="image"
                name="abc.jpg"
                id="abc"
                window_id="alphabet" />
            <child type="image"
                name="xyz.jpg"
                id="xyz"
                window_id="alphabet" />
         </collection>
```

FIG. 9D

Web Object (Native Application Object)

*Tag Attributes:*
- type="web"
- sub_type="mc" (for "Movie Clip") or type="image"
- x (can be "AUTO")
- auto_x_id  (only used when x is AUTO)
- auto_x_adjust (only used when x is AUTO)
- y (can be AUTO)
- auto_y_id  (only used when y is AUTO)
- auto_y_adjust (only used when y is AUTO)
- width
- height
- orig_width
- orig_height

*Example(s):*

*<element type="web"*
*name="hanging tree.swf"*
*x="0"*
*y="0"*
*width="100"*
*height="100"*
*orig_width="100"*
*orig_height="100" />*

FIG. 9E

Text Label and Text Button (Display Object)

*Tag Attributes:*
- type="text"
- sub_type="button" (text button only)
- color_up (text button only)
- color_over (text button only)
- color_down (text button only)
- border_line_color (text button only)
- border_line_alpha (text button only)
- border_fill_color (text button only)
- border_fill_alpha (text button only)
- url (text button only)
- window_id (text button only on url="WINDOW")
- text
- x
- y
- font
- size
- color (not supported for text button)
- alpha

*Child Attributes (only used for image buttons and when URL is "WINDOW" ):*
- type ("image" or "rox")
- sub_type (potentially "button" only when type is "image")
- id
- cfg (only when type is "rox") .
- name (only when type is "image")
- x (only when type is "rox")
- y (only when type is "rox")
- scale

*Example(s):* text label:
```
<element type="text"
    text="Montana Artist"
    x="0"
    y="46"
    font="_Century_Gothic"
    size="14"
    color="999999"
    alpha="1"/>
``` text button:
```
<collection type="text"
    sub_type="button"
    name="sub"
    font="_Arial"
    size="11"
    x="12"
    y="30"
    y_distance="26"
    color_up="999999"
    color_over="666666"
    color_down="aaaaaa">
  <element text=" Home "
      url="WINDOW">
    <child type="rox"
        id="home"
        window_id="site_main"
        cfg="home.rox"
        page="home"
        x="0"
        y="0" />
  </element>
</collection>
```

FIG. 9F

Text Button Collection (list of DOs)

*Tag Attributes:*
- type="text"
- sub_type="button" (text button only)
- x
- y
- y_distance
- color_up (text button only)
- color_over (text button only)
- color_down (text button only)
- border_line_color (text button only)
- border_line_alpha (text button only)
- border_fill_color (text button only)
- border_fill_alpha (text button only)
- font
- size
- color (not supported for text button)
- alpha

*Example(s):*
```
<collection type="text" sub_type="button" font="_Arial" size="11" x="12" y="30" y_distance="26"
color_up="999999" color_over="666666" color_down="aaaaaa">
   <element text=" Home " url="WINDOW">
      <child type="rox" id="home" window_id="site_main" cfg="home.rox" page="home" x="0" y="0" />
   </element>
   <element text=" Artist Statement " url="WINDOW">
      <child type="rox" id="artist_statement" window_id="site_main" cfg="common.rox" page="artist_statement" x="0" y="0" />
   </element>
   <element text=" Biography " url="WINDOW">
      <child type="rox" id="biography" window_id="site_main" cfg="common.rox" page="biography" x="0" y="0" />
   </element>
   <element text=" Artwork " url="WINDOW">
      <child type="rox" id="artwork" window_id="site_main" cfg="common.rox" page="artwork" x="0" y="0" />
   </element>
</collection>
```

FIG. 9G

Text Field (DO - width and height provided and configured using css stylesheet)

*Tag Attributes:*
- type="text"
- text (_CDATA - text goes in CDATA tags)
- x
- y
- width
- height

*Example(s):* xml node:
```
<element type="text"
        text="_CDATA"
        x="0"
        y="10"
        width="600"
        height="660" >
   <![CDATA[<h3><br>With a background rich in international culture, estates and <br></h3>
   ]]>
</element>
``` css:
```
h1
{
 font-family: "_Century_Gothic_Bold";
 color: #aaaaaa;
 font-size: 14;
}
h2
{
 font-family: "_Arial";
 color: #aaaaaa;
 font-size: 12px;
 text-align: center;
}
h3
{
 font-family: "_Calibri";
 color: #aaaaaa;
 font-size: 16px;
 text-align: center;
}
h4
{
 font-family: "_Arial";
 color: #aaaaaa;
 font-size: 14px;
}
h5
{
 font-family: "_Century_Gothic";
 color: #999999;
 font-size: 12px;
}
```

FIG. 9H

Shape (Display Object)

*Tag Attributes:*
- type ("rectangle" or "circle")
- sub_type="background" (background only)
- x
- y
- width (can be AUTO)
- height (can be AUTO)
- border_line_color
- border_line_alpha
- border_fill_color
- border_fill_alpha
- corner_radius (rectangle only)

*Example(s):*

```
<element type="rectangle"
    sub_type="background"
    x="0"
    y="20"
    width="1040"
    height="670"
    auto_width_adjust="-180"
    auto_height_adjust="-14"
    border_line_size="2"
    border_line_color="101729"
    border_line_alpha="0.1"
    border_fill_color="000000"
    border_fill_alpha="0.8"
    corner_radius="0" />
```

Form (Display Object list of fields and button for submittal to configurable URL)

*Tag Attributes:*
- type (in quotes: contact, inquiry, etc.)
- text (_CDATA - text goes in CDATA tags)
- x
- y

*Example(s):*

```
<element type="form"
    sub_type="contact"
    x="16"
    y="100" />
```

FIG. 9I

Data

*Tag Attributes - general case:*
- none

*Child Attributes (data fields):*
- name (name of field)
- value (value of field)

*Tag Attributes - embedded within collection for publish case:*
- begins
- cfg_name
- prepend

*Example(s):* data collection file - data_products_artwork_1.rox:

```
<collection type="data">
  <field name="sort_order" value="42" />
  <field name="name" value="Windmill.jpg" />
  <field name="title" value="Windmill" />
  <field name="price" value="5000.00" />
  <field name="subject_primary_category" value="Paintings" />
  <field name="subject_secondary_category" value="Contemporary" />
  <field name="subject_tertiary_category" value="Acrylic on Canvas" />
  <field name="summary" value="_CDATA">
    <![CDATA[<h4>Acrylic on canvas. Image of a Windmill.</h4>]]>
  </field>
</collection>
```

FIG. 9J

E reference within button collection XML:

```
<element type="data" begins="data_products_artwork" cfg_name="artwork_collection" prepend="view_">
  <view type="rox" cfg="artwork_template.rox" x="70" y="20" />
  <element name="@" url="WINDOW">
    <child type="rox" cfg="@" id="@" window_id="home_main" x="0" y="0" />
  </element>
</element>
```

<u>Tag Attributes - general case:</u>
- page (optional)
<u>Child Attributes:</u>
- see child objects in Fig. 8J
<u>Example(s):</u>

```
<?xml version='1.0' encoding='UTF-8'?>
<rox>

<collection page="home" type="window_links">
   <child type="image" name="lion_opt.jpg" id="lion_opt.jpg" window_id="grid_image_1" x="0" y="0" width="956" height="500" mask="true" mask_width="956" mask_height="500"/>
   <child type="rox" cfg="home_text.rox" id="home_text" window_id="grid_text_1" x="0" y="0" />
   <child type="rox" cfg="grid_blue.rox" id="grid_blue_1" window_id="grid_1" x="0" y="0" />
 </collection>
  <collection page="test_drive" type="window_links">
   <child type="image" name="flowers_opt.jpg" id="flowers_opt.jpg" window_id="grid_image_1" x="0" y="0" width="956" height="500" mask="true" mask_x="0" mask_y="0" mask_width="956" mask_height="500"/>
   <child type="rox" cfg="test_drive_text.rox" id="test_drive_text" window_id="grid_text_1" x="563.6" y="0" />
   <child id="blank" window_id="grid_1" />
   <child id="blank" window_id="grid_2" />
   <child type="rox" cfg="grid_blue.rox" id="grid_white_20" window_id="grid_20" x="0" y="0" />
  </collection>
</rox>
```

FIG. 9K site_main.rox

```
<rox>
 <element type="image" sub_type="background" name="pagebg.gif" />
 <collection type="preload">
  <cfg name="home.rox" />
  <cfg name="home_main.rox" />
  <cfg name="home_welcome.rox" />
  <component name="UIScrollBar" />
  <font name="_Arial" />
 </collection>
 <collection type="window" id="site_main">
  <child page="home" type="rox" cfg="home.rox" id="home" />
  <child page="artist_statement" type="rox" cfg="common.rox" id="artist_statement" />
  <child page="biography" type="rox" cfg="common.rox" id="biography" />
  <child page="artwork" type="rox" cfg="common.rox" id="artwork" />
  <child page="search_results" type="rox" cfg="common.rox" id="search_results" />
  <child page="comission_artwork" type="rox" cfg="common.rox" id="comission_artwork" />
  <child page="purchase_artwork" type="rox" cfg="common.rox" id="purchase_artwork" />
  <child page="art_purchasing_information" type="rox" cfg="common.rox" id="art_purchasing_information" />
  <child page="inquiries" type="rox" cfg="common.rox" id="inquiries" />
  <child page="artwork_category_one" type="rox" cfg="artwork_category_one.rox" id="artwork_category_one" />
 </collection>
</rox>
```

FIG. 10A common.rox

```
<rox>
  <element type="rectangle" sub_type="background" testname="thisone" x="0" y="-14" width="914" height="2000" border_line_size="2" border_line_color="101729" border_line_alpha="0.1" border_fill_color="000000" border_fill_alpha="0.8" corner_radius="0" />
  <element type="rectangle" sub_type="background" x="2" y="-14" width="909" height="2000" border_line_size="1" border_line_color="ffffff" border_line_alpha="0.1" border_fill_color="ffffff" border_fill_alpha="0" corner_radius="0" />
  <element type="rox" cfg="header.rox" x="10" y="AUTO" auto_y_id="common" auto_y_start="10" />
  <element type="rox" cfg="left_bar.rox" id="left_bar" x="16" y="100" />
  <element page="artist_statement" type="rox" cfg="artist_statement.rox" x="260" y="AUTO" auto_y_id="common" auto_y_adjust="30" />
  <element page="biography" type="rox" cfg="biography.rox" x="260" y="AUTO" auto_y_id="common" auto_y_adjust="30" />
  <element page="artwork" type="rox" cfg="artwork.rox" x="260" y="AUTO" auto_y_id="common" auto_y_adjust="30" />
  <element page="search_results" type="rox" cfg="search_results.rox" x="260" y="AUTO" auto_y_id="common" auto_y_adjust="30" />
  <element page="comission_artwork" type="rox" cfg="comission_artwork.rox" x="260" y="AUTO" auto_y_id="common" auto_y_adjust="30" />
  <element page="artwork_category_one" type="rox" cfg="artwork_category_one.rox" x="20" y="AUTO" auto_y_id="common" auto_y_adjust="30" />
  <element page="purchase_artwork" type="rox" cfg="purchase_artwork.rox" x="260" y="AUTO" auto_y_id="common" auto_y_adjust="30" />
  <element page="art_purchasing_information" type="rox" cfg="art_purchasing_information.rox" x="260" y="AUTO" auto_y_id="common" auto_y_adjust="30" />
  <element page="inquiries" type="rox" cfg="inquiries.rox" x="260" y="AUTO" auto_y_id="common" auto_y_adjust="30" />
  <element type="rox" cfg="footer.rox" x="20" y="AUTO" auto_y_adjust="-12" auto_y_id="common" />
</rox>
```

FIG. 10B header.rox

```
<rox>
 <element type="text" text="William Hawkins Hunter" x="0" y="20" font="_Century_Gothic" size="24" color="cccccc" alpha="1"/>
 <element type="text" text="Montana Artist" x="0" y="46" font="_Century_Gothic" size="14" color="999999" alpha="1"/>
</rox>
```

FIG. 10C left_bar.rox

```xml
<rox>
  <element type="rectangle" name="main" y_step="26" y_step_times="6" x="14" y="47" width="180" height="0.6" border_line_size="0" border_line_color="666666" border_line_alpha="0" border_fill_size="1" border_fill_color="666666" border_fill_alpha="1" corner_radius="0" />
  <!--defines the top left menu buttons-->
  <collection type="text" sub_type="button" name="sub" font="_Arial" size="11" x="12" y="30" y_distance="26" color_up="999999" color_over="666666" color_down="aaaaaa">
    <element text=" Home " url="WINDOW">
      <child type="rox" id="home" window_id="site_main" cfg="home.rox" page="home" x="0" y="0" />
    </element>
    <element text=" Artist Statement " url="WINDOW">
      <child type="rox" id="artist_statement" window_id="site_main" cfg="common.rox" page="artist_statement" x="0" y="0" />
    </element>
    <element text=" Biography " url="WINDOW">
      <child type="rox" id="biography" window_id="site_main" cfg="common.rox" page="biography" x="0" y="0" />
    </element>
    <element text=" Artwork " url="WINDOW">
      <child type="rox" id="artwork" window_id="site_main" cfg="common.rox" page="artwork" x="0" y="0" />
    </element>
    <element text=" Comission Artwork " url="WINDOW">
      <child type="rox" id="comission_artwork" window_id="site_main" cfg="common.rox" page="comission_artwork" x="0" y="0" />
    </element>
    <element text=" Purchase Artwork " url="WINDOW">
      <child type="rox" id="purchase_artwork" window_id="site_main" cfg="common.rox" page="purchase_artwork" x="0" y="0" />
    </element>
    <element text=" Art Purchasing Information " url="WINDOW">
      <child type="rox" id="art_purchasing_information" window_id="site_main" cfg="common.rox" page="art_purchasing_information" x="0" y="0" />
    </element>
  </collection>
  <!--defines the picture of mercury within the left side menu area-->
  <element type="image" name="whh.gif" x="18" y="220" width="100" height="200" />
  <element type="text" text="_CDATA" name="main" x="-8" y="448" width="190" height="100">
    <![CDATA[<h2e>William Hawkins Hunter<br>805.259.7444<br>whh@knox.net</h2e>]]>
  </element>
  <element type="rectangle" name="main" y_step="26" y_step_times="2" x="14" y="547" width="180" height="0.6" border_line_size="0" border_line_color="ffffff" border_line_alpha="0" border_fill_size="1" border_fill_color="666666" border_fill_alpha="1" corner_radius="0" />
  <!--defines the top left menu buttons-->
  <collection type="text" sub_type="button" name="sub" font="_Arial" size="11" x="12" y="530" y_distance="26" color_up="999999" color_over="666666" color_down="aaaaaa">
    <element text=" Create my dream painting! " url="WINDOW">
      <element type="rox" sub_type="window" id="comission_artwork" window_id="site_main" cfg="common.rox" page="comission_artwork" x="0" y="0" />
    </element>
    <element text=" Will my artwork be safe in the mail? " url="WINDOW">
      <element type="rox" sub_type="window" id="art_purchasing_information" window_id="site_main" cfg="common.rox" page="art_purchasing_information" x="0" y="0" />
    </element>
    <element text=" What will the shipping cost be? " url="WINDOW">
      <element type="rox" sub_type="window" id="art_purchasing_information" window_id="site_main" cfg="common.rox" page="art_purchasing_information" x="0" y="0" />
    </element>
    <element text=" Inquire about a piece? " url="WINDOW">
      <element type="rox" sub_type="window" id="inquiries" window_id="site_main" cfg="common.rox" page="art_purchasing_information" x="0" y="0" />
    </element>
  </collection>
  <element type="image" name="mixed.gif" x="16" y="640" width="50" height="50" />
</rox>
```

FIG. 10D artwork.rox
```
<rox>
 <collection type="text" sub_type="button" name="main" font="_Arial" size="12" x="-36" y="110" x_distance="600" color_up="cccccc" color_over="999999" color_down="ffffff" border_line_size="2" border_line_color="eeeeee" border_line_alpha="0.1" border_fill_size="2" border_fill_color="ffffff" border_fill_alpha="0" corner_radius="0" >
   <element text=" << more " url="home" slider_left_control_id="ranches" />
   <element text=" more >> " url="services" slider_right_control_id="ranches" />
 </collection>
 <collection type="image" sub_type="slider" id="ranches" x="-40" y="50" object_x_buffer="12" object_y_buffer="4" object_buffer="4" width="670" line_color="cccccc" line_alpha="0.1" bar_color="666666" bar_alpha="0.1" line_width="2" bar_width="44">
   <element type="data" begins="data_subject" cfg_name="artwork_collection" prepend="view_">
    <view type="rox" cfg="artwork_main_template.rox" x="20" y="10" />
    <element name="@" url="WINDOW">
     <child type="rox" cfg="@" id="@" window_id="slider1" x="0" y="0" />
    </element>
   </element>
 </collection>
 <element type="window" id="slider1" center_x="410" center_y="346" max_width="400" max_height="400" border_line_size="2" border_line_color="dddddd" border_line_alpha="0.2" border_fill_size="10" border_fill_color="111111" border_fill_alpha="0" corner_radius="0">
   <child type="rox" cfg="view_data_subject_1.rox" id="view_data_subject_1.rox" x="0" y="0" />
 </element>
 <element type="window" id="full_screen" center_x="410" center_y="346" max_width="400" max_height="400" border_line_size="2" border_line_color="dddddd" border_line_alpha="0.2" border_fill_size="10" border_fill_color="111111" border_fill_alpha="0" corner_radius="0">
   <element id="blank" />
 </element>
</rox>
```

FIG. 10E footer.rox

```
<rox>
 <element type="text" text="_CDATA" x="40" y="70" width="700" height="60" >
  <![CDATA[<h4><a href="http://abc.com">Home</a> | <a href="/properties.php">Browse Artwork</a> | <a
href="/mls_search-f13424.html">Find Artwork</a> | <a href="/about.php">About Will</a> | <a href="/community-
c10890.html" class="scriptline">Comission Artwork</a> | <a href="/marketing-advantage-c11663.html">Purchasing</a> | <a
href="/contact.php">Contact Will</a> | <a href="/terms.php">Terms</a> | <a href="/sitemap.php">Sitemap</a></h4>]]>
 </element>
 <element type="text" text="_CDATA" x="230" y="84" width="600" height="60" >
  <![CDATA[<h4>Copyright 2009 William Hawkins Hunter. All rights reserved.</h4>]]>
 </element>
</rox>
``` view_data_subject_1.rox

```
<rox>
 <element type="rox" sub_type="data" cfg="data_subject_1.rox"/>
 <element type="rox" cfg="artwork_main_template.rox" x="20" y="10"/>
</rox>
``` data_subject_1.rox

```
<rox>
 <collection type="data">
  <field name="sort_order" value="1" />
  <field name="name" value="AnitaEkberg.jpg" />
  <field name="title" value="Anita Ekberg" />
  <field name="price" value="5000.00" />
  <field name="subject_primary_category" value="Paintings" />
  <field name="subject_secondary_category" value="Contemporary" />
  <field name="subject_tertiary_category" value="Acrylic on Canvas" />
  <field name="summary" value="_CDATA">
   <![CDATA[<h4>Acrylic on canvas. Image of Anita Ekberg.</h4>]]>
  </field>
 </collection>
</rox>
``` artwork_main_template.rox

```
<rox>
 <element type="window" id="center" center_x="410" center_y="346" max_width="400" max_height="400">
  <child type="image" sub_type="button" url="WINDOW" name="@name" border_line_size="2" border_line_color="dddddd"
border_line_alpha="0.2" border_fill_size="10" border_fill_color="111111" border_fill_alpha="0" corner_radius="0">
   <child type="rox" id="@name" window_id="full_screen" cfg="full_screen_image_template.rox" x="0" y="0" />
  </child>
 </element>
 <element type="text" text="@title" font="_Century_Gothic_Bold" size="18" x="-40" y="150" color="999999" scroll="no" />
 <element type="text" text="_CDATA" x="-40" y="170" width="240" height="452" scroll="no" >
  <![CDATA[@summary]]>
 </element>
</rox>
```

APPLICATION RUNTIME ENVIRONMENT AND FRAMEWORK

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

CROSS-REFERENCES TO RELATED APPLICATIONS

This application claims the benefit of U.S. Provisional Patent Application No. 61/402,726, filed Sep. 3, 2010, the disclosures of which patent applications are incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

The material on the enclosed compact disc is incorporated by reference as if fully set forth herein. A listing of the files is as follows:

File folder: patentApp - this is the root directory containing all files
    site_data_and_template_publish_configuration_file_example.rox, 869 B, 09/04/2011 - this is an example of a publish configuration file for publishing of optimized application content
from data files and template files.
    File folder: com - this is the root directory for runtime/framework class files.
        File folder: rationalgallery - this directory contains core runtime/framework files.
            File folder: services
                File folder: core
                      Button_Object.as, 8.352 KB, 09/04/2011
                      Button_Slider.as, 10.906 KB, 09/04/2011
                      Cfg_Loader.as, 2.205 KB, 09/04/2011
                      Component_Loader.as, 3.535 KB, 09/04/2011
                      E.as, 30.478 KB, 09/04/2011
                      Font_Loader.as, 2.215 KB, 09/04/2011
                      Form_Object.as, 8.140 KB, 09/04/2011
                      Light.as, 19.953 KB, 09/04/2011 (coded for compiling
FACEBOOK ® application example, schange necessary to compile web site files)
                      Main.as, 5.01 KB, 09/04/2011
                      Shape_Object.as, 9.67 KB, 09/04/2011
                      Text_Object.as, 4.63 KB, 09/04/2011
                      ViewObject.as, 8.13 KB, 09/04/2011
                      Web_Object.as, 30.2 KB, 09/04/2011
                      Window_Object.as, 8.23 KB, 09/04/2011
                      File folder: includes
                          _Auto.as, 10.3 KB, 09/04/2011
                          _Rest.as, 2.21 KB, 09/04/2011
                          _Security.as, 759 B, 09/04/2011
                          _Slider.as, 5.12 KB, 09/04/2011
                          _Syncronize.as, 2.33 KB, 09/04/2011
                          Window.as, 8.76 KB, 09/04/2011
                      File folder: fonts
                          _Arial.as, 3.67 KB_Publish.as
                File folder: tools - this directory contains all
FACEBOOK ® application example files and the _Publish.as file.
                _Publish.as, 293 B, 09/04/2011 - this file is for execution
of a development tool for publishing of optimized configurations with data and template files.
                    FacebookInterface.as, 1.61 KB, 09/04/2011 - this file
completes the Facebook example by showing how the application connects with the
FACEBOOK ® service.
                    File folder: fbmodels - this directory contains files for
obtaining FACEBOOK ® data and inserting application configurations into application
memory.
                        AlbumModel.as, 7.03 KB, 09/04/2011 - this file
grabs a configurable number of albums from the Facebook service.
                        PhotoModel.as, 4.10 KB, 09/04/2011- this file
processes photos for individual albums.
            File folder: FacebookAppProject - this directory contains all static configurations
supporting the exemplar FACEBOOK ® app project, with many more files being built
dynamically.
                File folder: RG
                    File folder: data
                        data_config_0.rox, 391 B, 09/04/2011
                        data_config_1.rox, 389 B, 09/04/2011
                        data_config_2.rox, 394 B, 09/04/2011
                        data_config_3.rox, 392 B, 09/04/2011
                    File folder: design
                        album_text_template.rox, 182 B, 09/04/2011
                        footer.rox, 272 B, 09/04/2011 full_screen_image_template.rox, 745 B, 09/04/2011
header.rox, 459 B, 09/04/2011
logo.rox, 745 B, 09/04/2011
nav_home.rox, 324 B, 09/04/2011
nav_template.rox, 144 B, 09/04/2011
photo_template.rox, 282 B, 09/04/2011
photo_text.rox, 186 B, 09/04/2011
photo_window.rox, 523 B, 09/04/2011
site_main.rox, 1001 B, 09/04/2011
style.css, 588 B, 09/04/2011
File folder: flash
Empty
File folder: images
woodtexturebackground.jpg, 8.18 KB, 09/04/2011
File folder: publish
Empty
File folder: view
Empty
File folder: SimpleWebSiteProject - this directory contains the files for the exemplar website project including the use of "window_links" schema object.
File folder: RG
File folder: data
Empty
File folder: design
bg_logo.rox, 747 B, 09/04/2011
common.rox, 8.798 KB, 09/04/2011
common_320.rox, 8.775 KB, 09/04/2011
common_480.rox, 8.775 KB, 09/04/2011
common_854.rox, 8.775 KB, 09/04/2011
customer_reviews_text.rox, 416 B, 09/04/2011
footer.rox, 2.221 KB, 09/04/2011
footer_320.rox, 2.249 KB, 09/04/2011
grid_blue.rox, 261 B, 09/04/2011
header.rox, 415 B, 09/04/2011
home_text.rox, 923 B, 09/04/2011
logo.rox, 745 B, 09/04/2011
name.rox, 884 B, 09/04/2011
nay.rox, 1.198 KB, 09/04/2011
nav_customer_reviews.rox, 161 B, 09/04/2011
nav_home.rox, 332 B, 09/04/2011
nav_privacy_policy.rox, 157 B, 09/04/2011
nav_terms_of_use.rox, 155 B, 09/04/2011
nav_test_drive.rox, 153 B, 09/04/2011
nav_where_to_buy.rox, 155 B, 09/04/2011
privacy_policy_text.rox, 1.167 KB, 09/04/2011
site_main.rox, 3.068 KB, 09/04/2011
site_main_320.rox, 3.080 KB, 09/04/2011
style.css, 596 B, 09/04/2011
terms_of_use_text.rox, 6.859 KB, 09/04/2011
test_drive_text.rox, 923 B, 09/04/2011
where_to_buy_text.rox, 447 B, 09/04/2011
File folder: flash
Empty
File folder: images
export.png, 80.656 KB, 09/04/2011
facebook.png, 57.244 KB, 09/04/2011
facebook_opt.png, 5.168 KB, 09/04/2011
flowers_opt.jpg, 61.454 KB, 09/04/2011
flowers_small.jpg, 5.358 KB, 09/04/2011
hawaii_opt.jpg, 109.583 B, 09/04/2011
lion_opt.jpg, 140.846 B, 09/04/2011
lion_small.jpg, 68.191 KB, 09/04/2011
logo.jpg, 13.957 KB, 09/04/2011
logo_small.jpg, 5.810 KB, 09/04/2011
myspace.png, 75.282 KB, 09/04/2011
myspace_opt.png, 5.572 KB, 09/04/2011
playing_with_water_opt.jpg, 86.147 KB, 09/04/2011
playing_with_water_small.jpg, 20.854 KB, 09/04/2011
real_estate_html_background.gif, 106 B, 09/04/2011
summer_colors_opt.jpg, 96.030 KB, 09/04/2011
summer_colors_small.jpg, 29.802 KB, 09/04/2011
sunflowers_opt.jpg, 132.097 B, 09/04/2011
sunflowers_small.jpg, 4.414 KB, 09/04/2011
twitter.png, 67.688 KB, 09/04/2011
twitter_opt.png, 5.400 KB, 09/04/2011

```
File folder: publish
    Empty
File folder: view
    Empty
```

BACKGROUND OF THE INVENTION

This invention relates to interne applications. In particular, the invention relates to an application runtime environment and framework for codeless development and cloud hosted components and configurations.

Background art technologies and methods for creating web sites and software applications, rich internet applications (RIA) or not, are too complex at the language and implementation levels. Data-configurable solutions for RIA content use multiple software platforms and components to achieve data persistence, retrieval manipulation and view (e.g., open source Content Repository for Java® Technology API (JCR)). Complex systems involve multiple installed components that must integrate with multiple hardware and software systems in their configuration (e.g., LINUX® operating system, APACHE™ web server, mysql, php, browser and potentially JAVASCRIPT® programming language, and/or FLASH® player). Furthermore, layout using hypertext markup language (HTML and CSS, including HTML5) is cumbersome, and alternatives can be difficult to develop because of their complexity and can easily result in sites that are more complex to maintain and slower to load on the web. Background art data-driven RIA content management systems (CMS, also referred to as web content management (WCM) and enterprises content management (ECM)) do not allow for enough possibilities in RIA design and are limited in terms of performance (e.g., dot corn domain wix, ADOBE® CQ5).

Implementations of simple database driven software applications (web, desktop, mobile) today are much more complex than they need to be. A few types of data records, including primary and foreign keys, and perhaps reference data, along with content such as images and static text are all the data that are generally required. User interfaces for web applications are fairly easy to build, but interfacing with such a simply structured database over the Internet is complex.

Systems supporting the addition and editing of such data over the Internet require even more complexity. Scalability is accomplished primarily through the publishing of content derived from complex systems to cloud networks with multiple nodes distributed from a single node, such as AMAZON® S3 and CLOUDFRONT® services. With the right choice of software, such as CQ5 Web Content Management (acquired by Adobe in October 2010), workable and scalable systems can be accomplished, but the systems themselves are much more complex than they need to be. Companies that can solve this problem charge a premium for their products costing much to the end-user including additional costs in time and resources associated with running the multiple components.

This problem exists as the result of the cumbersome standards-based technology on which such systems are built and is furthered by the additional complexity associated with the newer demands presented to web and software application developers today such as the need to support multiple devices (including multiple screen sizes and resolutions) and operating systems. This technological barrier can be bypassed through the re-invention of the base systems that applications run on. What is needed is a solution to this problem that expands upon a useful object oriented coding concept in use today.

The FLASH® ACTIONSCRIPT® 3 (AS3) language created by Adobe (Macromedia), and supported in APPLE® XCode today, contains a unique implementation for adding and removing application components from application display (and corresponding system processing). Software applications created with this technology consist of objects extended from display object and display object container classes (interactive or display only), that support the concept of a display object tree within a software application. Within this structure, there is always a single root object within the tree that can contain any number of children, whose children can contain further children and so on resulting in a tree of objects for display and user-interaction in the form of an application. This technology helps to provide an environment in which objects can be built as combinations of other objects and where chunks of objects can be grouped together or added and removed from display using this simple construct.

The background art is characterized by U.S. Pat. No. 7,155,676 and U.S. Patent Application Nos. 2002/0100027 and 2007/0011650; the disclosures of which patent and patent application are incorporated by reference as if fully set forth herein.

BRIEF SUMMARY OF THE INVENTION

As used herein, the following terms and variations thereof have the meanings given below, unless a different meaning is clearly intended by the context in which such term is used:

"A," "an" and "the" and similar referents used herein are to be construed to cover both the singular and the plural unless their usage in context indicates otherwise.

"About" means within ten percent of a recited parameter or measurement, and preferably within five percent of such parameter or measurement.

"Comprise" and variations of the term, such as "comprising" and "comprises," are not intended to exclude other additives, components, integers or steps.

"Exemplary," "illustrative," and "preferred" mean "another."

In an illustrative embodiment (embodiment A), the invention is an application runtime environment and framework application running within the ADOBE® FLASH® runtime and expanding on the concept of display object (interactive or display only), display object container, and display object tree. It is applied to similar objects configurable through a simple extensible markup language (XML) interface rather than through computer coding but also supporting the load and instantiation of compiled FLASH® objects themselves. The application runtime environment and framework exists as versioned instance(s) on cloud file-hosting service(s) as set(s) of compiled application component objects to be accessed on-demand from client software applications (e.g., web browsers or other instilled applications) upon linking to (via the web) or executing (via an installed app) a web software application or component built using the application runtime environment and framework. (Apple policy states that application components must be installed with applications in the case of APPLE® iOS, however, so application components are compiled within installed applications rather than potentially loaded over the Internet in that case). The application runtime environment and framework supports consistency across multiple platforms and operating systems through implementations across multiple languages.

Support for data structures including data persistence is supported through this same interface (the XML schema) where relationship between application configuration and application data are closely tied through the use of global and transitionally utilized memory through processing in what could be considered analogous to a printing press (and wherein data nodes are referred back to [upon associated application component transition through the iteration through transitioned object and contained child objects for data object references to reprocess and thus re-serialize to software application memory]). In this embodiment, the invention provides an application runtime environment supporting interactive communication, fast performance, and a thin memory profile—all supported by the "tree" of potentially interactive display objects implemented through the systematic processing of XML files.

In this embodiment, the invention supports an application programming interface (API) through a preferred XML schema. The invention is both a runtime environment (runtime), in that it is a running application supporting software applications running within it, and a framework in that it supports the building of software applications itself. The stage or canvas available to the software application is controlled by this runtime and supports typical application display and behavior including support for processing of data (relational or other), layout and processing of platform-native software applications within.

In embodiments of the invention, developed software applications may be configured solely through the XML schema and/or inject platform native applications within the runtime. This technology supports codeless software development and software application hosting from cloud-based static file hosting services. Application configuration for the runtime is based on XML file representation of display object container (interactive or display only) and/or database table record(s) comprised of single level list [list level including support for single-level list as list item (i.e. "element" and "collection" nodes supported within root node where collection nodes support single level lists of display object references)] of XML nodes. This list contains display object references in z-order implementing component objects loaded on-demand supporting object configuration, interactive object transition, and data persistence. Persistence is implemented through HTTP Post and Representational State Transfer (REST) API from Adobe for access to AMAZON® S3 and CLOUDFRONT® services. Alternatively or in combination, persistence to a local file system is also supported with installed software applications running on ADOBE® AIR® runtime or compiled from ADOBE® products supporting other target platforms (e.g., FLASH® BUILDER® AS3 project with iOS target).

XML tags specific to other functions are supported as well including: a) asynchronous preloading of files for embedded software object configuration, fonts and application components, b) tags for sending bulk messages for transition to objects existing in memory, and c) tags for conveying configurable data to the software application. Data files are structured and organized in such a way that can take on the form of a relational database while at the same time act as configurations in processing including support for publishing of application configuration files for scaleable processing through distributed access on CLOUDFRONT® services.

In an illustrative embodiment, the XML schema optionally utilizes CSS for text-based components and is used as a simpler alternative to HTML, JAVASCRIPT® programming language, FLASH® language and C++ and other languages in terms of the creation of software applications of all kinds. The schema supports efficient development through easy to understand and configure layout and object reuse through implementation of data-driven templates or software application starting points. Application configurations through this schema may be accomplished manually or through systematic/programmed means (e.g., a program queries a FACEBOOK® account for data and builds files (including data files and references to them) for use by the software application. Unique, complex, data-driven, data changing software applications may be developed using the invention with no functions, variables, databases, SQL statements, web servers, or server side scripts to interact with. Software applications developed with the invention are faster to load over the Internet than comparable web software applications and can be created and maintained in a much less complex manner than prior art.

This extremely simplified format for software application configuration, data processing, interaction and messaging between system components allows for dynamically changing and interactive software applications to be developed with relatively little effort as compared to the background art. In this embodiment, the invention transitions technology that is computer coded and compiled for configuration into a high-performance runtime for cloud software applications that is instead configurable through the editing and processing of these simply formatted XML files through manual or system-programmed/automated means.

In an alternative illustrative embodiment, rather than running in the ADOBE® FLASH® Player, the technology and schema described in embodiment A are supported natively in all major web browsers (and would preferably be adopted by the industry as a supported web standard) as a native web application, thus not requiring a third party plugin (the plugin in embodiment A is ADOBE® FLASH® Player, but the invention itself could also be produced as a plugin) or loading of files required by the runtime over the Internet. In an illustrative embodiment, the invention supports the embedding of platform-native third-party applications within browser-embedded application configurations in the spirit of the GOOGLE® Native Client project. Further, in an illustrative embodiment, the invention supports the packaging of platform-native third-party applications for all major operating systems thus implementing applications similar to the use of ADOBE® AIR® runtime in embodiment A.

In the background art, proven technologies (e.g., HAXE) for porting FLASH® AS3 projects to C++ and JAVASCRIPT® programming language exist and are free. In this regard, the implementation of this embodiment is possible today. Projects such as Alchemy (an interface to a high performance LUA language within ADOBE® FLASH® Player), and the continued performance improvement to all relative Internet technologies promise to enhance software application runtime environment and framework performance.

In another illustrative embodiment, the invention is a system and method that operates in accordance with a sequence of instructions that implements a set of classes and compiled components forming high performing and simplified frameworks for rich web software applications. In this embodiment, the framework uses a set of simpler components that can interact and communicate with each other to implement complex behavior including data persistence and retrieval.

In another illustrative embodiment, the invention is a tangible computer-readable medium (e.g., a compact disc) containing a sequence of instructions that implements a plurality of compiled objects available for web service or local software application execution.

In another illustrative embodiment, the invention is a tangible computer-readable medium containing a sequence of instructions that implements a configuration/implementation (xml, swf and image files specific to an individual implementation).

In another illustrative embodiment, the invention is a tangible computer-readable medium containing a sequence of instructions that implements a tool for changing configuration and publishing optimized content.

In another preferred embodiment, the invention is a tangible computer-readable medium containing a sequence of instructions that implements any method disclosed herein.

In another illustrative embodiment, the invention is a machine, method and process for basing a software application off of recursively embedded XML file representations of display object containers [and display object (including interactive objects)] and/or data record(s).

In another illustrative embodiment, the invention is a system operated in accordance with software instructions that implement a set of classes including the following: 'Light' for light/small file size, 'ViewObject' for overall layout and scrolling, 'Main' as root for display object tree, and 'E' for "embedded" in which each E object instantiation is supported by the processing of a single XML configuration file containing a list of nodes in z-order in terms of canvas layering, of display object and data nodes (including child Display Object Containers through embedded E and/or Window objects) indicated using "element" and "collection" nodes within root "e" node.

In an illustrative embodiment, the invention is a system for configuring and running a software application (wherein said software application may be a computer application or application component running on said system), said system comprising: a computing device having a processor, a memory, and an operating system, said computing device being programmed to provide a runtime environment (wherein said runtime environment is a configurable application allowing custom software application configuration and execution) for the software application by: providing an application display object tree (wherein said application display object tree is a functional tree of configured software application components) comprising a plurality of display object containers (wherein configuration of software application components may be segregated into their own configuration file(s) and may be referenced by multiple components within a software application, each of these files configuring a single display object container object as part of the software application display object tree), said application display object tree serving as a framework for the software application; and maintaining a plurality of application objects for configuring and running a plurality of application components within the runtime environment; wherein the software application is configured by a plurality of static files (wherein said static files require no compiling or external processing of configuration instructions, rather processing occurs only in the runtime environment at the time of application publishing and at runtime) or a single static file, wherein said single static file comprises an individual display object container configuration containing references to static file configurations of child display object container (wherein said display object containers comprise a programmatic structure for organizing child display objects and display object containers for inclusion as a unit within the software application) configuration files for display object containers and contains references to configuration files representing child objects (e.g., within a programmatic tree structure forming the software application executing within the runtime environment) of said display object container. In another embodiment, said runtime environment is an operating system. In another embodiment, said runtime environment is a web browser. In another embodiment, said runtime environment is a web browser plugin. In another embodiment, said runtime environment is an installed application.

In another illustrative embodiment, said static files (e.g., comprising an individual display object container configuration) comprise: a plurality of display object and display object container references in z-order (wherein said z-order implements component layering within the software application); or a plurality of instructions for branches of said application display object tree to transition with another branch of said application display object tree (wherein said transition involves the removal of one display object or display object container, including the potential display object tree contained within it, while adding another in its place or not); or a plurality of data collection references in the form of individual files containing name/value pair collections of variables for persistence to said memory for retrieval during software application component instantiation and processing; or a plurality of indications to preload application components and configuration files before they are encountered in processing; or a combination thereof. In another embodiment, said runtime environment is said operating system. In another embodiment, said runtime environment is a web browser. In another embodiment, said runtime environment is a web browser plugin. In another embodiment, said runtime environment is an installed application.

In another illustrative embodiment, said computing device is further programmed to provide a runtime environment for the software application by: loading and instantiation of native applications as display objects. In another embodiment, said runtime environment is an operating system. In another embodiment, said runtime environment is a web browser. In another embodiment, said runtime environment is a web browser plugin. In another embodiment, said runtime environment is an installed application. In another embodiment, said plurality of static files are further configured by referencing a child display object container that is configured by a single configuration file.

In another illustrative embodiment, the invention is a method for configuring a software application, said method comprising: running a runtime environment and a framework within a browser plugin, or as a browser plugin, or running a native application executing said runtime environment, or serving as a computer operating system on a computing device having an operating system; accepting a user input modifying a configurable set of extensible markup language application configuration files and saving said configurable set of extensible markup language application configuration files to a configurable location in said memory, said configurable set of extensible markup language application configuration files containing a representation of the state of software application pages and components; processing said configurable set of extensible markup language application configuration files to produce the software application; and executing the software application within said runtime environment.

In yet another illustrative embodiment, the invention is a method for configuring a runtime environment to run a configurable and interactive software application on a computing device having a processor, a memory, a screen and a user input device, said method comprising: accepting a user input to the user input device, said first user input creating a configurable set of extensible markup language application configuration files based on a first defined schema, or accepting another user input to the user input device creating a configurable set of JavaScript Object Notation application configuration files based on a second defined schema; processing one of said configurable sets of application configuration files with said processor to a configurable location in said memory, said one of configurable sets of application configuration files containing a representation of the state of the pages and components of the configurable and interactive software application; and instantiating the configurable and interactive software application; wherein processing said one of said configurable sets of application configuration files comprises processing a display object tree comprising a plurality of display object containers with each display object container represented by a single application configuration file following one of said defined schemas. In another embodiment, at one of said application configuration files comprise at least one said display object container text file that references another display object container file.

In a further illustrative embodiment, the invention is a method for codeless development of an interactive software application utilizing an extensible markup language-driven runtime environment and framework, said method comprising: loading into a computing device a means for testing a new configuration for the interactive software application by: downloading a versioned instance of an application tool comprising the extensible markup language-driven runtime environment and framework to the computing device from a cloud file-hosting service, or downloading a versioned instance the extensible markup language-driven runtime environment and framework to a computing device from a cloud file-hosting service; building the interactive software application by accepting a user input modifying a configurable set of extensible markup language files using a schema comprising a plurality of lists of objects to configure a display object tree that represents the interactive software application, each of said lists of objects comprising a plurality of display object references, display object container references, and data record references in z-order configuring a plurality of component objects to produce a plurality of configured component objects to be loaded into said computing device on demand; running the interactive software application by loading said plurality of configured component objects into said computing device and instantiating said configured component objects; and loading said plurality of configured component objects into a static file hosting service and running the interactive software application from configuration files hosted from said static file hosting service; thereby making said plurality of configured component objects available for other users to use.

In yet another illustrative embodiment, the invention is a method of developing a software application, said method comprising: executing an application comprising a runtime environment and framework having an application stage on a computer having a processor, a memory, a user interface device; accepting an input from a user via said user interface device that creates a directory within said memory in which said software application files are to be stored; creating a set of configuration files for the software application and storing said set of configuration files in said memory, said set of configuration files containing a representation of the software application in the form of an extensible markup language display object tree; instantiating said runtime environment and a plurality of application classes that are configured by means of said set of configuration files and implementing a preview of the software application; evaluating software application dependencies and loading software application files; loading software application dependencies including the loading of software application components; instantiating a root object for processing of said extensible markup language display object tree; displaying the current state of the software application; centering the software application within said application stage; and accepting a user interaction with the software application. In another embodiment, the method of developing a software application further comprises: accepting an input from said user indicating that said user wishes to add a plurality of user interface components that are derived from said runtime environment and framework or that are accessible by running a native application as part of the software application; prompting and accepting input from said user of a plurality of configuration values for each added user interface component in an extensible markup language format; saving said plurality of configuration values to said memory and displaying the current state of the software application; reevaluating software application dependencies and reloading software application files; reloading software application dependencies and reloading software application components; reinstantiating a root object for processing of said extensible markup language display object tree; recompleting a display of the current state of the software application; recentering the software application within said application stage; and redisplaying software application for use.

In a further illustrative embodiment, the invention is a system for codeless development of a software application, said system comprising: a client computer comprising a processor, a memory and a monitor; a server; wherein said server is operative to download a versioned instance of a runtime environment and framework for instantiation in combination with a plurality of application configuration extensible markup language files into a said client computer; wherein said client computer is operative to accept user input modifying extensible markup language lists representing individual display object containers running within the software application, said extensible markup language lists comprising a plurality of display object references in z-order configuring a plurality of component objects to produce a plurality of configured component objects to be loaded into said client computer on demand; and wherein said server is operative to download said plurality of configured component objects into said client computer.

In another illustrative embodiment, the invention is a tangible computer-readable medium having computer-executable instructions for performing a method comprising: running a runtime environment within a player or a browser operating on a computer having a processor and a memory; accepting user input modifying an extensible markup language application configuration file that is resident in said memory, said extensible markup language configuration file containing a representation of the state of a software application comprising an application page; processing said extensible markup language application configuration file to produce said software application; and executing said software application within said runtime environment.

In another illustrative embodiment, the invention is a system for executing a software application, said system comprising: a client computer comprising a processor; a server;

wherein said processor is programmed to enable a user to configure a display object tree that represents the software application in accordance with a set of files containing extensible markup language lists, said extensible markup language lists each comprising a plurality of display object references that configure a plurality of component objects; and wherein said server is operative to download said plurality of configured component objects into said client computer.

In yet another illustrative embodiment, the invention is a system for developing a software application, said system comprising: means for executing an application comprising a runtime environment and framework having an application stage on a computer; means for accepting an input from a user that creates a directory within said memory in which said software application files are to be stored; means for creating a set of configuration files for the software application and storing said set of configuration files, said set of configuration files containing a representation of the software application in the form of an extensible markup language display object tree; instantiating said runtime environment and a plurality of application classes that are configured by means of said set of configuration files and implementing a preview of the software application.

Further aspects of the invention will become apparent from consideration of the drawings and the ensuing description of exemplary embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate exemplary embodiments of the invention. In the drawings:

FIG. 2 is a schematic block diagram that illustrated the software components in accordance with an illustrative embodiment of the invention.

FIG. 7 is a schematic block diagram in accordance with an illustrative embodiment of the invention.

FIGS. 8A and 8B present a listing for an XML file in accordance with an illustrative embodiment of the invention.

FIGS. 9A-9K are listings of available XML schema objects in accordance with an illustrative embodiment of the invention, including descriptions and example sections.

FIG. 10A-10F are illustrative listings of E object xml illustrated by the diagrams in FIGS. 11 and 12.

FIG. 13 is a screen shot from an application created to create applications with an illustrative embodiment of the invention and using it in three separate portions of the user interface of the application as displayed with the screen shot.

Figure 1:
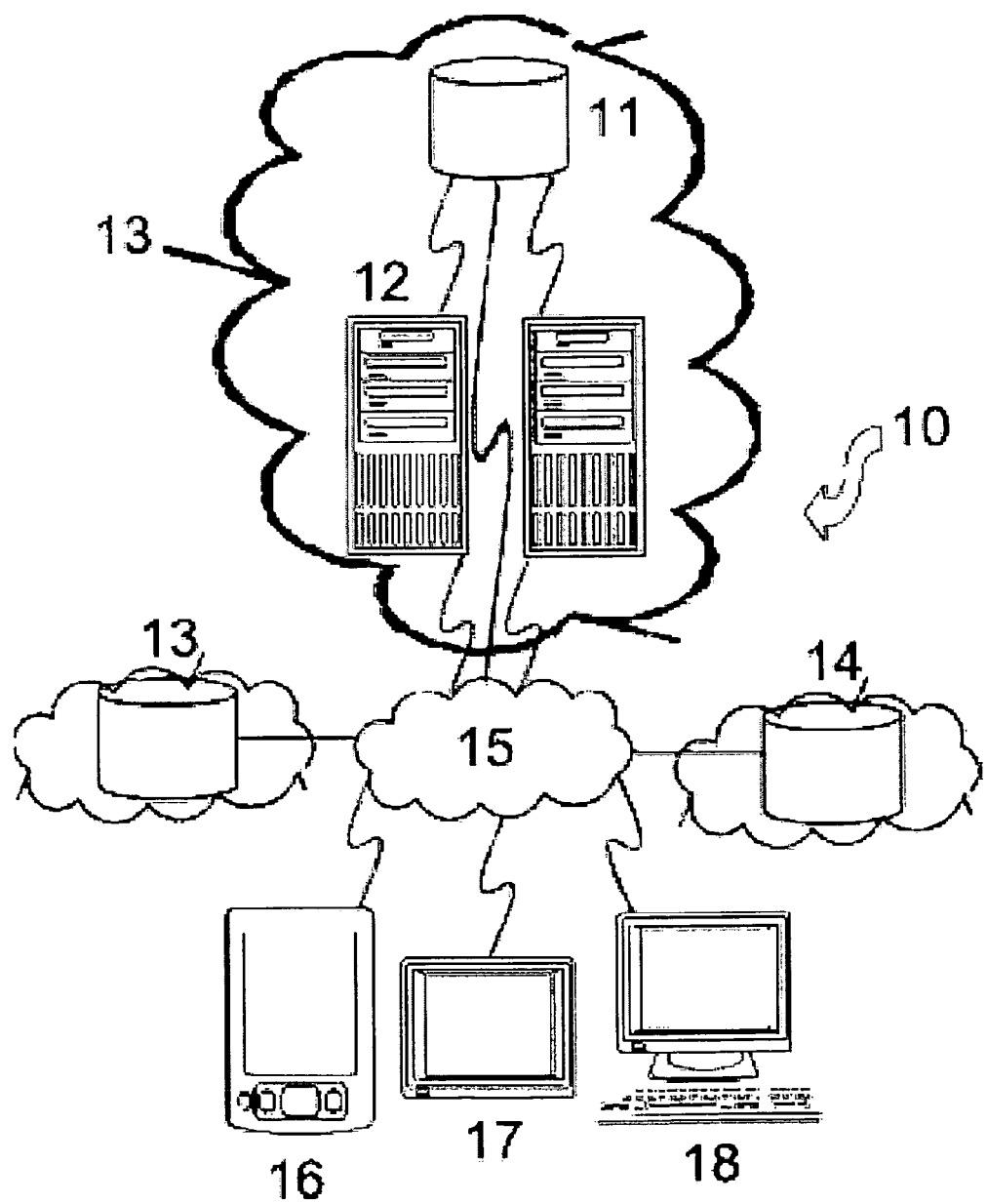
FIG. 1 is a schematic block diagram that presents an illustrative embodiment of the invention.

The following reference numerals are used to indicate the parts and environment of an illustrative embodiment invention on the drawings:

10 system
11 single node file storage servers, single node service
12 server, network server
13 cloud-based static file hosting service
16 mobile computing device
17 social media web service
18 personal computer
19 network
20 video and image sharing service
21 television
30 application
31 software application
40 display object containers
41 light component
42 view object component
44 main component
46 embedded component
48 window object component
50 slider object component
51 configuration loader component
53 record component
54 record set component
55 albums model component
56 photos model component
60 display object
62 web object component
64 shape object component
66 text object component
68 button object component
70 form object component
80 runtime/framework files
85 component loader component
83 font loader component
84 configuration loader component

DETAILED DESCRIPTION OF THE INVENTION

Referring to FIG. 1, an illustrative embodiment of system 10 is presented. In this embodiment, system 10 comprises software application 31 running within multiple devices including software application 31 running within mobile computing device 16, software application 31 running within television 17 and web software application 31 running within web browser on personal computer 18. System 10 utilizes a distributed network which is connected to cloud-based static file hosting service 13 which comprises single node file storage servers 11 and redundant servers hosting static files from network edge locations. Software applications 31 running as configurations of system 10 access configuration XML files hosted from single node service 11 for more timely information (such as a product quantity available during checkout in an e-commerce application) and from faster edge locations for less likely to change files such as for a web site home page. Software applications 31 running as configurations of system 10 may be configured to access video, image and other data from social media web service 17 and images and videos from video and image sharing web service 20. Internet network 19 supports communication between system 10 components.

Before data stored on web services 13 and 17 can be utilized by software application 31, it must be queried and converted to application XML configuration files as disclosed herein, such as with the FACEBOOK® app example provided. Data files using the invention XML schema can play the database role alone as well, with provided Record class 53 and RecordSet class 54 being used to publish application configurations for optimized performance as well as to populate a data grid within a user interface for editing of the data. Using the FACEBOOK® software application example, software applications 31 running as configurations of system 10 are used to access images and data hosted from web service 13 and then publish and view that data in XML format to and from cloud service 13 along with files containing configurations for combining that data with application design template configuration XML files thus forming the net application configuration.

Buttons accessible through software application 31 are used to facilitate navigation among pages and page components within software applications. The state of each software application page and page component is managed by means of application XML configuration files that are stored either on mobile computing device 16, television 21, personal computer 18 or on cloud-based static file hosting service server 12. In a preferred embodiment, system 10 is implemented in the ADOBE® FLASH® AS3 language and serves as an application runtime environment running within the FLASH® runtime.

Referring to FIG. 2, components of an illustrative embodiment of system 10 are presented. In this embodiment, system 10 is operated in accordance with software application 31 comprising software instructions that implement a plurality of display object containers 40, a plurality of display objects 60 and a plurality of runtime/framework files 80. In this embodiment, each instantiation of software application 31 using runtime/framework files 80 comprises: light component 41, view object component 42, main component 44, embedded component 46, window object component 48 and other optionally configured display object components instantiated through embedded component 46.

In an illustrative embodiment, light component 41 (herein Light) implements support for quick load of software application dependencies including load of view object class, software application configuration files, font classes, application component classes such as preload animation classes. Light is intended to be small in size for quick loading across the Internet and built to asynchronously load a list of application files for fast application instantiation and performance within software applications. Light contains shape object, component loader, config loader and font loader classes compiled within to support these functions. View object component 42 (herein ViewObject) implements support for main layout components including optionally configured background image and main content window including support for application horizontal and vertical scroll bars and associated scrolling (including touch scrolling and alter/hide of scroll bars on devices supporting touch screens). ViewObject supported background images are not applied to layout calculations including scrolling/scroll bars. ViewObject contains main (Main) and embedded object (E) components <?> and classes compiled within it <?>.

Main component 44 (herein Main) contains the root level display object container (E) for implementation of main content window and holds any data configurations as they are assigned. It is used instead of ViewObject if surrounding scroll bars are not to be supported by the software application or application component. Embedded component 46 (herein E for "embedded") is an XML file-driven implementation of a commonly used display object container object (it extends Sprite object which extends Display Object Container object which itself extends Interactive Object in FLASH® AS3 language) for implementing system components including advanced dynamic layout functions and processing of XML. E object contains the core application component objects compiled within including: text object component 66 (herein TextObject), button object component (herein ButtonObject), web object component 62 (herein WebObject), window object component 48 (herein WindowObject) and slider object component 50 (herein SliderObject). Window object component 48 (herein WindowObject) is a display object container that can only contain one display object (or display object container) at a time and whose contents can change by interaction with other active system components visible to the user. In this embodiment, E objects and WebObjects qualify as WindowObject instance children.

In this embodiment, WebObject component 62 is an implementation of dynamically loading and system-interacting view components including implementation of image (static or image buttons) and flash (swf) files. ShapeObject component is an implementation of shapes including background and foreground shapes and colors. TextObject component implements CSS and non-CSS configured text for display and can optionally include a scroll bar as part of a text field. ButtonObject component is an implementation of text button for internal and external link. FormObject component 70 (herein FormObject) is an impelementation of user interactive forms. SliderObject component 50 SliderObject is an implementation of a scrolling display object container containing a dynamically stacked set of display objects that can scroll independently of the rest of an application page or page component.

In this embodiment, component loader file 82 (herein ComponentLoader) asynchronously loads compiled components for dynamic instantiation of UI components including simple ones such as scroll bars and more complex ones such as forms and form components. Class object files embedding fonts and compiled for use in software application 31 are similarly loaded using font loader component 83. Configuration loader component 51 (herein CfgLoader) similarly asynchronously loads application configuration XML into software application 31, over the Internet or from local directories accessible from a compiled software application 31. Both of these components are accessible within Light from any E component instantiation within the software application (i.e., Configurations may include asynchronous loading of application configuration XML and components as part of any E object instantiation).

Figure 3:
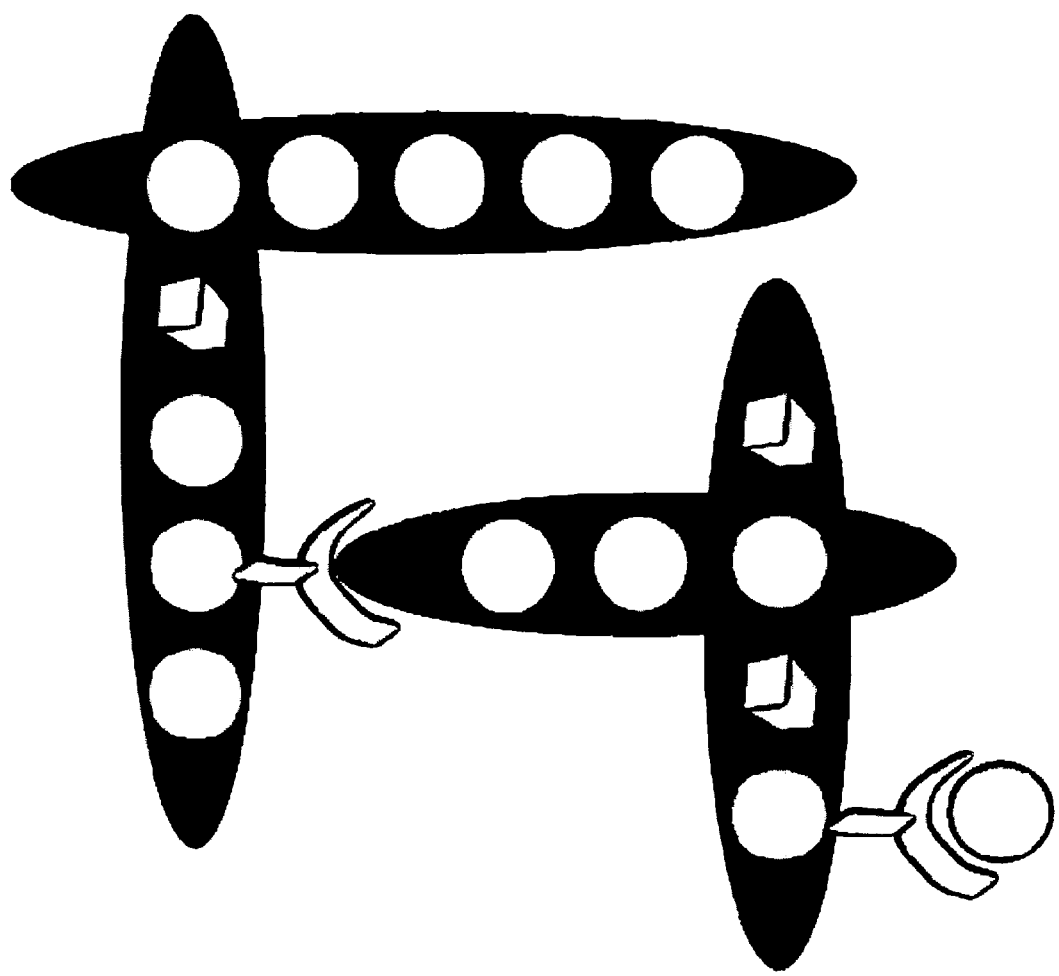
FIG. 3 is a schematic block diagram in accordance with an illustrative embodiment of the invention.

Referring to FIG. 3, a machine, method and process for basing software application 31 off of recursively embedded XML file representations of display object container (and display object) and/or data record(s) are illustrated.

Figure 4:
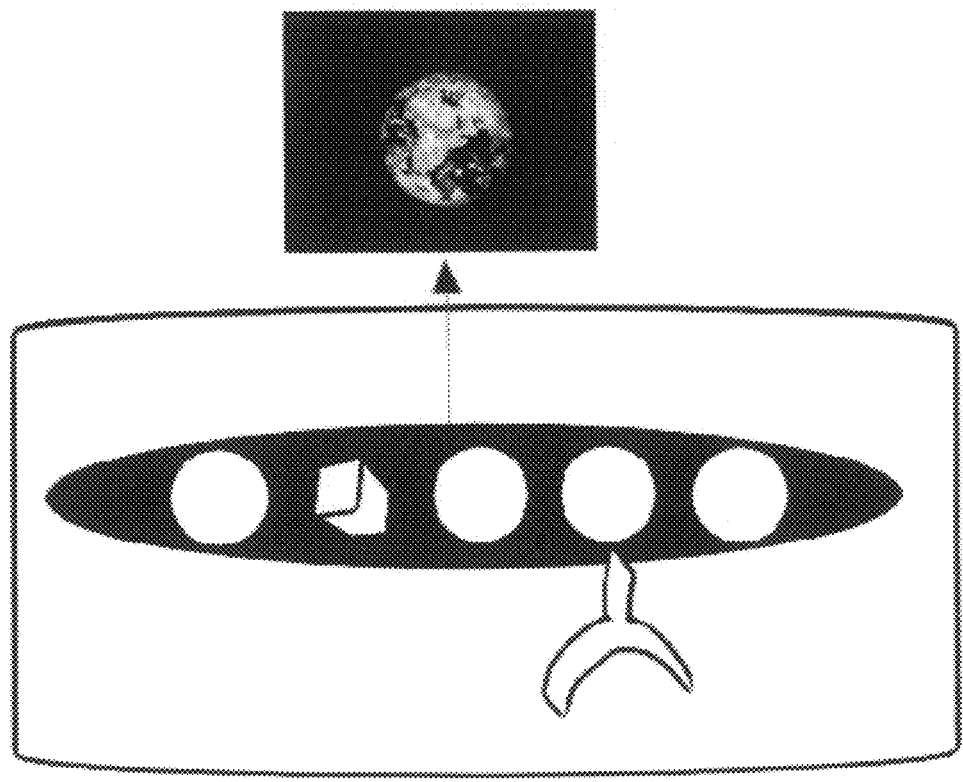
FIG. 4 is a schematic block diagram in accordance with an illustrative embodiment of the invention.
Figure 5:
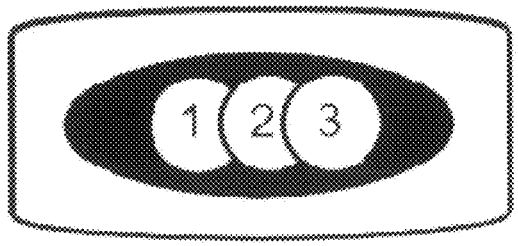
FIG. 5 is a schematic block diagram in accordance with an illustrative embodiment of the invention.

Referring to FIG. 4, a schematic diagram illustrates an embodiment of an aspect of the invention. In this aspect, system 10 is operated in accordance with software instructions that implement a class called 'E' for "embedded" in which each E object instantiation is triggered by processing of a single XML configuration file containing a list, with display object nodes in z-order (illustrated using FIG. 5) in terms of canvas layering, of display object and data nodes (including child Display Object Containers through embedded E and/or Window objects) which are indicated using "element" and "collection" nodes within root "rox" node.

Figure 6:
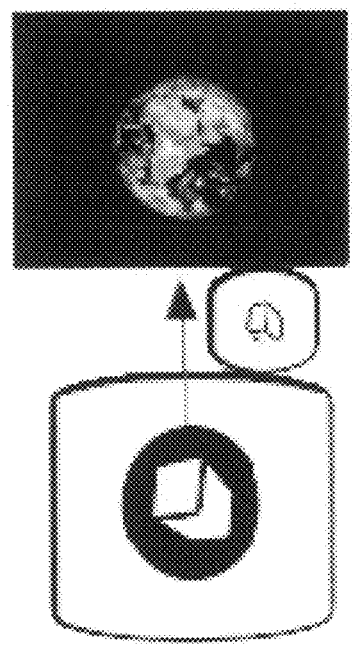
FIG. 6 is a schematic block diagram in accordance with an illustrative embodiment of the invention.

Referring to FIG. 6, another aspect of an illustrative embodiment of the invention is presented. In this embodiment, each file-based E object optionally handling its own set of loads (including its own XML configuration file and associated file dependencies including fonts and compiled application components if not already preloaded), data integration and layout processing (including connections for interactivity between application components). Alternatively, configuration XML files may asynchronously preload embedded XML files through supported "preload" tags in application configuration XML.

In this embodiment, data exist as XML file-based collections of name/value pairs representing individual records for use as configurations for display object nodes referenced within .rox file or as collections of records where, by convention, each record is contained as the single node within a file that is preferably named and accessed in the following way: data_[collection name]_[creation sequence number].rox.

In this embodiment, data are persisted and accessed this way in order to simplify the implementation of simple database-like structures such as tables, primary keys and foreign keys. Using the above example results in a record with the aforementioned name within a table named "collection name" with a primary key of "creation sequence number."

Referring to FIG. 7, another aspect of an illustrative embodiment of the invention is presented. In this embodiment, data are contained in memory of runtime application on a name/value pair basis only, with pairs frequently being overwritten by design. Implementation of multiple processing of templates applied to record data fields is accomplished by pre-loading data and design template configuration XML to enable E to process nodes incrementally vs. the default behavior being asynchronous processing of objects that then have to wait for dependencies to finish processing for display. Incremental processing, rather than immediate spin into asynchronous processing, allows for the thin representation of data within the application while implementing multiple data objects within the same page/component load that utilize the same field names (such as is the case with queries returning multiple records). These transitional field values are used to configure the addition of objects included in the template configuration to the display according to the values at that point in processing (e.g., blog entries on a blog consist of a series of data configurations to blog entry template XML file(s) to accomplish a vertical stack of blog entries displayed to a web page or application). An analogy to this would be a printing press where a different colored ink was applied to each print of the object on a page. Incremental processing allows an object requiring that data to finish using it before it gets changed from under it by an implementation of another record in that same table being accessed. In turn, button objects trigger re-hydration of the data associated with that button within the application to allow for such things as child objects based off of data represented by a button object.

In this embodiment, data records often also contain a standardized name/value pair of "sort_order" for sort ordering within implementation of data set within software applications 31. Further, data sets used by software application 31 may be managed through a GUI using file as representation of files used in data model. Reference data lists are supported for populating UI list boxes etc., and convention is that data objects using reference data use "value" field within referencing record fields (rather than the foreign key as in a typical reference data implementation or relational database). An example of this would be "use all files for data in list where file name begins with "data_locations" where 'state_type' field is 'MT' and 'city_type' field is 'Bozeman'".

In this embodiment, configuration XML for each E object instantiation may contain data objects for purposes such as processing of templatized object configurations on repeating sets of data. Implementation is similar to SQL query and resulting display of user interface using query data. Implements applications include e-commerce where data nodes and files represent such things as products, product manufacturers (reference data list example), orders and customer reviews. Data objects are processed at this object's level (within E object referencing data such as @product_name) but all fields are held and accessed from Main class on a name/value pair basis where only one value can be held for each name—to be potentially overwritten by subsequent data object configuration(s) in the course of processing.

In this embodiment, application data files must always be preloaded through E object supported "preload" tags and the processing of CfgLoader component. This is done to speed up processing of data in relation to the instantiation and display of application components. This feature avoids performance limitations associated with using the same class to process "data records" and "display object containers" before a preferred embodiment of CfgLoader was built. In an alternative embodiment, E may be instantiated for each configuration XML file, even if it is a data file.

In this embodiment, whenever possible, software applications are configured to preload application components asynchronously to speed up load and display of an application. Care is made to allow the processing and display of application components throughout the application display object tree to use a single thread of execution so as to not cause application components to ever wait for each other, thus slowing software application performance to the speed of asynchronous load plus the processor time to display the software application components.

In this embodiment, support for each E object instantiation that is not the root E object of the an application includes automatic positioning on the x and y axis for dynamic layout according to parent Display Object Container configuration and processing [relative to other objects configured as part of auto category (x, y) group name]. Images and native application objects displayed using WebObject component are not waited on for layout calculations but rather the size and location of those objects is estimated before they are loaded using application configuration XML. Each embedded E component makes a call back to its parent E component when it is ready to be counted as part of layout calculations, finally resulting in a correctly positioned application within the canvas available to the runtime.

In this embodiment, E support for auto x and y per group across child E and WebObjects is implemented through "element" tags (including Image, Image Button and SWF). E objects configured within auto x and/or y groups can be re-processed for changed layout including recursive notification to parent E objects and their respective auto x and y assignments. Objects can employ both auto x and y simultaneously within an object configuration.

In this embodiment, support for configuration XML for each E instantiation may contain pre-load indications for site components to facilitate asynchronous load of site/application dependencies including XML configuration files, and web service object/symbols for instantiation including compiled font and user interface component files. In this embodiment, support for root E configuration XML file is passed, URL encoded, as an argument from an HTML file containing embedded reference to software application, thus eliminating a single load cycle from initial application execution and load over the Internet. In an alternative embodiment, the FLEX® language is used to eliminate a second load cycle (initial application executable being .swf file in FLASH® implementation) in FLASH® implementations.

In this embodiment, E class utilizes a set of low-level application component-implementing classes supporting the creation and display of application components within a resulting display object tree, including functionality for layout and interaction including object transitioning within applications at runtime. In this embodiment, application messaging support is provided with XML driven application including the following: a) traversable display object tree through E objects and contained framework object arrays, including associated XML configurations, providing object details and messaging support including the triggering of window object transition, b) project level data model for use by software application 30 indicated for purposes of data editing forms and configuration, c) simple directory structure per project containing all application configurations including XML, native application (.swf in this case) and image files making finding existing files easy during development and processing. A combination of these inventive aspects allows for dynamic control through messaging and analysis of application state at runtime including iteration through objects and instantiated children of objects within tree that themselves are not currently within tree (such as objects that were in tree but were removed for object transition through a window link).

In this embodiment, the invention provides a basis for a codeless development system. Production/runtime application utilizes a single source node for application files accessed directly for sensitive tasks such as purchasing products where the same product of a finite quantity cannot be purchased by multiple people, and alternative use of redundant instances of data for less sensitive tasks where changed data does not need to be immediately apparent to other users of the application. This is accomplished through the use of AMAZON® S3 and CLOUDFRONT® services where the source node exists on S3 and that node is distributed on demand to the distributed CLOUDFRONT® system.

In illustrative embodiments, applications implemented using system 10 are fast for the following reasons: a) application software and configuration files and other system components are extremely, small and loaded on-demand, b) application execution can be configured to asynchronously load system components and configurations asynchronously together and allow for fast load and instantiation of contained components allowing the software application to run on an un-interrupted thread of execution for implementation of supported layout functions, and c) all application files are static which means they can always be served from cloud hosting services such as AMAZON® Web Services' high performing and ultra-scalable CLOUDFRONT® web service. These high performing features are primary benefits of preferred embodiments of the invention and are implemented using both smart system design and coding and by using code syntax allowing for service application objects to be compiled as separate entities (rather than combined resulting in larger files and slower performance). This is not to be confused with application configurations such as development of software applications using system 10 involving no compiling, unless data and files from web services such as web service 13 and 20 are to be accessed to support the software application. Alternative versions of the invention may support interfaces to services such as this through XML configurable means only (no software coding or compiling), or may support a better user interface for managing those configurations.

In this embodiment, several recursive algorithms used within application code allow for less code necessary to create full feature functionality. Each piece of code is executed in systems implemented using preferred embodiments of the invention, and is specific to that generic action being performed to be re-used wherever possible by related functionalities. Internal configuration of software code is built to efficiently handle multiple uses for these object aspects while intentionally limiting the number of logic statements to be executed in order to display an application. This aspect of code continually being improved upon forms the foundation for improvement of the invention.

Further, a coding technique of instantiating key class member objects with a type of '*' rather than a specific type and loading of those classes as individually compiled object files for purpose of asynchronous processing at most desirable time in application load and processing sequence is supported.

In an illustrative embodiment, when AS3 objects are compiled with the type descriptor of '*' then that class definition does not need to be within that object's list of "include" classes and therefore is not included within that object's compile, resulting finally a smaller file for use in service. Smaller files combined with strategic load sequences implemented per project (according to "preload" indications within published code) translates to better application performance. An example of this would be where ViewObject class is defined in Light class as var VOClass: Class;
var view:*;

and VOClass is loaded over the Internet as an individually compiled object (ViewObject contains Main class member which contains E class member and references, E containing arrays for system-level display object classes), with Light class hydrating VOClass object with loaded object with instantiation following. Compiled objects are loaded over Internet using this syntax in AS3 (alternative syntax supported by HAXE) to support subsequent class object instantiation as follows:

VOClass=loader.contentLoaderInfo.applicationDomain.getDefinition("com.rationalgallery.service s.core.ViewObject") as Class;

Next, in this example, once a class is loaded an object may be instantiated using this syntax:

view=new VOClass(this);

thus, completing the coding sequence necessary in implementing this illustrative embodiment of the invention.

In an illustrative embodiment, the invention enables new uses of existing technology as well as addition of completely new features such as the following: a) graphics filters for use with images and other display objects, b) different types of transitions through WindowObject, c) extension of current FormObject implementation to configure all metadata through XML rather than hard coded by type as currently, and d) support for use on operating systems and browsers without using the FLASH® Player such as with ports of the invention to JAVASCRIPT® and/or C++ language. The on-demand nature of preferred embodiments of the invention ensures room for enhancement before the service becomes too bulky for use as a high-performance web-service, as new features can be asynchronously loaded on-demand, incurring little or no cost to performance.

Figure 13:
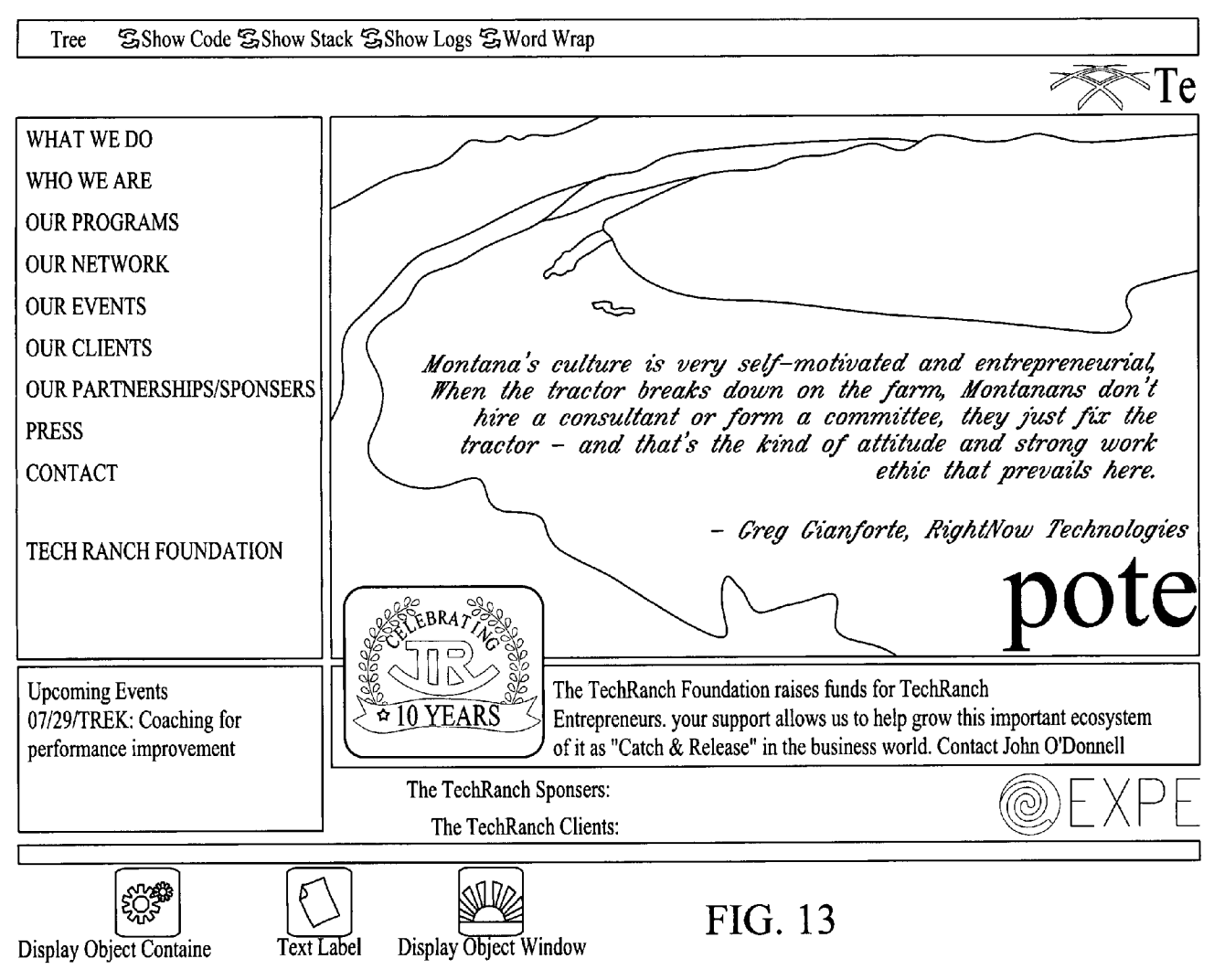

In alternative embodiments, the invention includes performance enhancements and additional features for mobile, business, collaboration, game and TV software. Further, basic feature additions including implementation of configurable application component panels with each panel containing separate software applications 31 and allowing for communication between these separate software applications 31 implemented within a single application 30. Such a software application 31 is illustrated in FIG. 13, a screenshot from software application 31 where the menu to the left as well as software application preview in the upper right and the minimized form at the upper right hand corner each are implemented through individual instantiations of the runtime environment implemented using the invention. This feature allows for more complex software applications 31 including separate and resizable panels separating user interface components within software application 30. This feature is somewhat analogous to HTML frames but can be built with more feature-rich functionality including inter-"frame" communication within software application 31.

In alternative embodiments, the invention is extendable in a virtually unlimited fashion through implementation of object oriented coding techniques such as separating core object functionality implementations into further distinguishable types through sets of objects instantiatable per type, while maintaining certain core aspects as included within each implementation. In this embodiment, dynamic component inclusion within the core component objects is implemented with specific objects specified in pre-load per implementation type, as to limit size of core objects as they grow and are used for segmented implementation purposes. This is achieved while maintaining load performance through growth of runtime/framework functionality.

The following use cases and corresponding claims describe illustrative embodiments of the invention in terms of it being used in the process of developing software application 31. Use case A involves creation of a simple example with text and window object containing image display object and surrounded by a shape object configured to surround the objects within application—all within single (application root) display object container.

In Step A.1, the user is working on a computer, using an application 30 that embodies aspects of the invention and used for the creation of other applications (these other applications are described as "software application 31" within this disclosure), and the user selects File—New Project—Blank Project.

In Step A.2., application 30 performs processing using a set of object oriented software classes and does various things including making a directory named with user entered project name and sub-directories of that directory named design (location of design XML files including template configurations utilizing transitional data), data (location of data XML files), view (data/template referencing files as a result of publish functionality), images (location of local images for use in application), and flash (location of custom FLASH® applications for use in application 31). In Step A.3, application 30 creates the configuration for the first example of the invention within project, an XML file named "site_main.rox" containing only default XML node <rox/>, is saved to the cfg directory. In this case, this file is the current representation of software application 31 being created.

In Step A.4, application 30 implements a "preview" of software application 31, Light, ViewObject, Main and the root E class are instantiated. In this case, the ViewObject class member layout object (obtained from a set of commercially-free open source layout classes that is available from Yahoo!® Astra the FLASH®) is used to contain the entire software application represented by the project, including: a) the implementation of dynamic calculation of scroll bar positions according to dynamically recursive processing of E objects contained within software application 31, b) dynamic positioning of software application 31 contents within application/browser window (centering on browser resize disregarding size of certain components flowing off of page for example), and c) placement of background objects including background image and background shapes that are not included in software application 31 layout calculations. In this case, instantiation of the ViewObject class member layout object is used for displaying Main class member instance (based on ADOBE® Display Object Container extended class—Sprite) implementing the "roots" of Display Object Tree implemented within application. In this case, Light class implements an asynchronous load of system components upon software application load. Loading of CSS (style.css), ViewObject/Main/E classes, font classes and any preload objects indicted within site_main.rox including other .rox configuration files.

Upon the completion of loading of each individual "preload" object, the object notifies the Light class of completion. When the last object has updated, processing continues including instantiation of Main and base E object and processing of objects indicated in site_main.rox (that is always the default file representing the root of the software application 31 display object tree, dynamically modified to other root files such as site_main_320.rox when the available screen pixels at application instantiation time is <=320 pixels), thus implementing dynamic adjustment of user interface at runtime according to pre-configured cutoffs in terms of available pixel dimensions. The Light class acts as the holder of all application runtime environment and framework object classes loaded to the software application (used for instantiation by child objects and child object dependencies). The Main class acts as the holder of all software application data persisted to software application 31 and as the holder of E class member as the base E object for software application 31.

In Step A.5, software application 31 evaluates software application 31 dependencies and evaluates site_main.rox file contents for the following objects to be loaded before further execution: a) preload font files, b) preload user interface control objects such as scroll bar or slider object, and c) preload indications for .rox files. In Step A.6, software application 31 loads application dependencies and triggers asynchronous loading of all system components evaluated as needed, including default loads of style.css (internal application .css file for text formatting).

In Step A.7, software application 31 notifies the Main class object of the successful loading of each software application preload dependency and instantiates root E object as the Main class member for the processing of Display Object list contained within site_main.rox after the last dependancy has been loaded. In Step A.8, software application 31 continues processing of the display of the current state of software application 31. Processing of empty Display Object list within site_main.rox is completed and root E object is notified of completion (by its self).

In Step A.9, software application 31 completes the display of the current state of software application 31, root E object notifies software application 31 ViewObject instance that processing is complete and that it can center software application 31 within application stage. In Step A.10, software application 31 causes the ViewObject instance to evaluate the size of Main class and center it within the stage accordingly and indicate to the scroll bars that there is no need to display them currently.

In this example, application 30 then supports adding a shape object. In Step A.11, application 30 triggers the adding of text to the software application display. The user moves a mouse over "Add Text Label" menu button and clicks it. Support for text label and text field display within the application is provided through the TextObject class. Text fields employ loaded css files and both text fields and labels optionally employ loaded font files for embedded font implementations.

In Step A.12, application 30 displays a user interface for entry of Text Label configuration and a user interface form is displayed prompting for entering of configuration properties. In Step A.13, application 30 configures the text label for display and the user enters object configuration field values including the following: text, x, y, font (drop down), size (drop down) and color (selector component). In Step A.14, application 30 saves the text label to root E (and thus to the software application 31 screen) user clicks Save button within Add Text Label form.

In Step A.15, application 30 processes Save application which triggers saving of XML node to root XML "e" node within site_main.rox that is representation of new text label. The resulting site_main XML contains the following contents:
<rox>
 <element type="text" text="Hello World" x="0" y="46" font="_Century_Gothic" size="14" color="999999"/>
</rox>

In Step A.16, software application 31 instantiates Main again within ViewObject class member (the same object) and processing continues with a re-visit of steps A.5-A.7. In Step A.17, software application 31 processes the text element node, triggering instantiation and adding to display object tree the indicated TextObject instance.

In Step A.18, software application 31 completes the display of the current state of software application 31, root E object notifies an ViewObject instance that processing is complete and that it can center software application 31 within the application stage, for example, on a computer monitor. In Step A.19, software application 31 causes the ViewObject instance to evaluate the size of the Main class and center it within the stage accordingly and indicates to the scroll bars that there is no need to display them currently. In Step A.20, software application 31 displays the text "Hello Word" in the center of the software application screen, the software application processing stops and software application 31 sits idle waiting for input.

In this example, application 30 then supports adding a shape object. In Step A.11-Triggering the adding of text to software application display user moves mouse over "Add Shape" menu button and clicks it. In this example, support is provided for implementation of rectangle, rounded rectangle and circle shapes. ShapeObjects include separate fill and line configurations for color and alpha. ShapeObjects also support a stagger functionality where a single ShapeObject may be used to implement a staggered set of shapes with the specified configurations including a configurable stagger amount. ShapeObjects may also be part of the background of software application 31 and intentionally not be included in layout calculations (but preferably the foreground is handled this way by default).

In this example, Shape objects support auto width and height based on an auto id associated with an E or WebObject instance reaching a resting state, including the parent of ShapeObject using an id of "this". Shape objects configured with auto width and/or height groups may be re-processed for changed child layout and dimensions including recursive notification to parent E objects and their respective auto x and y assignments.

In Step A.12, application 30 displays a user interface for entry of Shape Object configuration, and a user interface form is displayed prompting for entering of configuration properties. In Step A.13, application 30 supports configuring a text label for display. The user enters object configuration field values including the following: x, y, width, height, auto_width_adjust, auto_height_adjust, border_line_size, border_line_color (selector component), border_line_alpha, border_fill_color (selector component), border_line_alpha, border_fill_color (selector component), border_fill_alpha, corner radius. In Step A.14, application 30 saves Shape to root E (and thus to software application screen) when the user clicks Save button within Add Shape form. In Step A.15, application 30 processes saving of the software application and triggers saving of the XML node to the root XML "e" node within site_main.rox that is a representation of the new shape. The resulting site_main XML contains the following contents:
<rox>
 <element type="text" text="Hello World" x="60" y="26" font="_Century_Gothic_Bold" size="50" color="999999"/>
 <element type="rectangle" x="-10" y="10" width="AUTO" auto_width_id="this" auto_width_adjust="100" height="AUTO" auto height_id="this" auto height_adjust="100" border_line_size="10" border_line_color="dddddd" border_line_alpha="1" border fill_size="10" border_fill_color="111111" border_fill_alpha="0.9"/>
</rox>

In Step A.16, software application 31 instantiates Main again within ViewObject class member (object re-instantiated through re-instantiated Light as parent object), processing continues with a re-visit of steps A.5-A.7. In Step A.17, software application 31 causes processing of the text element node, triggering instantiation and adding to display object tree the indicated TextObject instance. In Step A.18, software application 31 causes processing of shape element node, and upon reaching width and height configurations of "AUTO," the addition of the shape is delayed. In Step A.19, software application 31 indicates that E object is finished processing. Root E object notifies (recursively down tree from this object) the ShapeObject that it is loaded which triggers ShapeObject to be created with dimensions of this (root E) E object's dimensions with adjustments indicated within "auto_width_adjust" or "auto_height_adjust" fields.

In Step A.20, software application 31 completes the display of the current state of software application 31, instantiated within software application 31 that notifies application 30 ViewObject instance that processing is complete and that it can center software application 31 within the application stage. In Step A.21, software application 31 causes the ViewObject instance to evaluate the size of the Main class and centers it within the stage accordingly and indicates to the scroll bars that there is no need to display them currently.

In Step A.22, software application 31 displays the text "Hello Word" in the center of the software application 31 screen, surrounded by rounded rectangle. Then, software application 31 processing stops and application sits idle waiting for input.

In this example, application 30 then supports adding an image object. In Step A.23, application 30 triggers the addition of an image to the software application display when the user moves mouse over "Add Image" menu button and clicks it. In this example, support of displaying of an image, an image button and display and execution of external SWF files through WebObject class is provided. The WebObject class supports the loading of these files over the Internet and positioning of these images and swf files, including static, background and image button type images and "stagger" type image collection. The "slider" type collections also employ SliderObject class. Optional support is provided for image and image button implementations of the WebObject class to utilize optional fields for border and background rectangle, including configuration for color and alpha values.

In this example, support is provided for images, image buttons and swf file implementations of WebObject to qualify as WindowObject (this object is discussed later in this disclosure) children and within auto x and y groups processed within E objects. Support is provided for image Buttons to trigger messages to one or up to all instantiated WindowObjects within software application 31, regardless of whether WindowObject instance is currently being displayed within Display Object tree.

In Step A.24, application 30 displays a user interface for entry of image configuration. A user interface form is displayed prompting for entering of configuration properties. In Step A.25, application 30 supports configuring of the image for display when the user enters object configuration field values including the following: name (drop down from those imported to project), x, y, width, and height. In Step A.26, application 30 saves the image to root E (and thus to the software application screen) when user clicks Save button within Add Image form.

In Step A.27, processing Save application triggers save of the XML node to the root XML "e" node within site_main.rox that is a representation of new image. The resulting site_main XML contains the following contents:
<rox>
  <element type="text" text="Hello World" x="60" y="26" font="_Century_Gothic_Bold" size="50" color="999999"/>
  <element type="rectangle" x="–10" y="10" width="AUTO" auto_width_id="this" auto_width_adjust="100" height="AUTO" auto_height_id="this" auto_height_adjust="100" border_line_size="10" border_line_color="dddddd" border_line_alpha="1" border_fill_size="10" border Jillcolor="111111" border_fill_alpha="0.9"/>
  <element type="image" name="worldjpg" x="18" y="220" width="100" height="200"/>
</rox>

In Step A.28, software application 31 instantiates Main again within ViewObject class member (the same object), and processing continues with a re-visit of steps A.5-A.7. In Step A.29, processing of text element node by software application 31 occurs triggering instantiation and adding to display object tree the indicated TextObject instance. In Step A.30, processing of shape element node by software application 31 occurs, and upon reaching width and height configurations of "AUTO" the add of shape is delayed. In Step A.31, processing of image element node by software application 31 occurs, triggering instantiation and adding to display object tree the indicated WebObject instance. In Step A.32, software application 31 causes the WebObject instance to notify the parent E object instance (root E) upon successfully loading and being added to display object tree. In Step A.33, software application 31 indicates that the E object is finished processing, root E object notifies (recursively down tree from this object) the ShapeObject that it is loaded which triggers ShapeObject to be created with dimensions of this (root E) E object's dimensions with adjustments indicated within "auto_width_adjust" or "auto_height_adjust" fields. In Step A.34, completing the display of the current state of software application 31, root E object notifies application ViewObject instance that processing is complete and that it can center the software application 31 within application stage. In Step A.35, the ViewObject instance evaluates the size of Main class and centers it within the stage accordingly and indicates to the scroll bars that there is no need to display them currently. In Step A.36, software application 31 displays the text "Hello Word" in the center of the software application screen, software application processing stops and the software application sits idle waiting for input.

Referring to FIGS. 8A and 8B, exemplar E object XML files are presented. Support for positioning and transitioning between child objects within display object tree is provided through utilization of the WindowObject class. WindowObject is a compiled object/symbol representation of the Display Object Container class configurable from XML and utilized as container for a single Display Object at a time. WindowObject transitions are triggered through events, such as mouse click or other events initiated by end-user of software application 31 and are configurable for a particular use. The Object contains algorithms for switching currently processing display object container with a newly instantiated display object container or one existing in memory if such is the case. Most software applications 31 implemented using the invention employ a preferred page-level window for transition that can be tied to a web browser's back and forward navigation buttons.

In this example, WindowObjects work in combination with E objects to do most of the work within an interactive implementation of software application 31. These objects facilitate the transition of display objects at any level from canvas overlay over portion of current screen down to page level (whole screen) transitions. WindowObjects are used to implement interactive object transitions and behavior (including internal page-level transitions) for few (in the case of a software application running in browser—most often one browser page load per site visit) browser page loads throughout a site browsing session for fast performance. WindowObjects are also used for such interactive UI components such as menus and image galleries.

Event messaging requests that a window change what it is displaying (if that object is not already displayed) and results from ButtonObject and WebObject instance events. Messages travel recursively through instantiated E objects within the software application, starting with the root E object and traveling through each child down the display object tree until either a matching window object is found or all window objects have been checked. A passive messaging system is used by the application (that it, the system does not cause application failures upon inability to communicate with desired target object) allowing for significant message traffic and corresponding object transition to occur simultaneously through simple configurations. Objects requested to be displayed within the application that are already displayed as child of another WindowObject are removed from that object automatically and displayed in the requested object according to a configured transition for display. These features allow system 10 to be configured extremely simply compared to the background art for implementation of interactive applications.

In an illustrative embodiment, E processes configuration XML files recursively, most often resulting in instantiated display objects including recursively instantiated E objects with the end product being a display object tree instantiated within a softwareapplication. FIGS. 8A-8S describe an illustrative list of compiled software application component object interface XML in accordance with an illustrative embodiment of the invention.

In an illustrative embodiment, the application runtime environment and framework utilizes thin low-level components that communicate with each other to perform interactivity and layout functions. The application runtime environment and framework architecture is based on a display object container class along with a set of external classes in various forms and is built to support operational speed and GUI-based editing. This main class (E) processes specially configured xml files (representing display object and display object container lists in z-order within a display object container created through instantiation of E) recursively, most often resulting in instantiated display objects including recursively instantiated E objects. The end product being a display object tree instantiated within a client application. Runtime/framework components are loaded in addition to custom components on-demand, thus enabling high-performance, advanced layout functions, and powerful component re-use capabilities.

In another illustrative embodiment, application runtime environment and framework support is provided, with the help of external cloud-specific file management APIs for application data edits without external system components such as databases or server side scripts. In this embodiment, all components of the application runtime environment and framework disclosed herein are static files on the server side, thus enabling static file cloud service implementation. Client applications bring over data from sta for edit, and save back to static file cloud service after resolving conflicts with current state of data across usage of client applications associated with said data on Internet.

Figure 12:
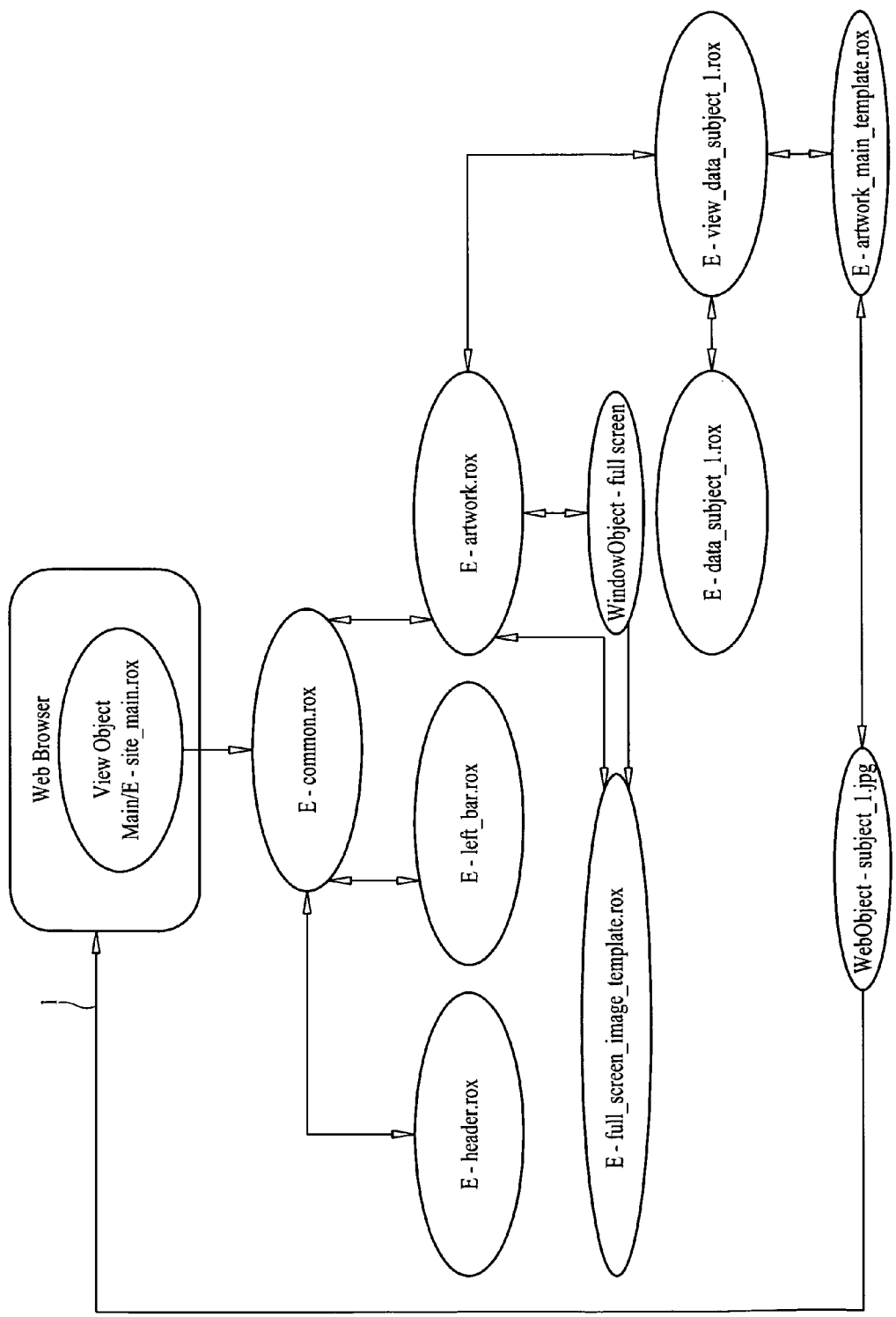
FIG. 12 is a schematic process flow diagram that presents an illustrative embodiment of the invention in terms of what happens when an object within the software application display object tree is transitioned (part of tree removed and a new part added potentially).

In another illustrative embodiment, the application runtime environment and framework is designed for GUI based editing, including free-transform and drag-and-drop editing. Such an application is illustrated in FIG. 12, a screenshot from a software application 31. The simple nature of the application runtime environment and framework disclosed herein involves configuration being lists of objects—each object containing a fairly simple list of attributes. Software applications are deployed by using external cloud-specific file management APIs directly or, more conveniently, through GUIs associated with the application runtime environment and framework. Software application deployment includes file upload and trigger of deployment across static file cloud service edge data centers. Software application deployment includes files of the following type: .rox, .swf, .html (root URL file containing embedded software application), and most standard image formats including .jpeg, .gif, .png. New deployments trigger updates to client applications through incremental adjustment to referenced software application component URLs that must change, thus minimizing the impact to load performance of software application updates.

In another illustrative embodiment, the application runtime environment and framework instantiation disclosed herein is based upon commercial use. Proliferation of the application runtime environment and framework disclosed herein depends on billing category as well as account billable for each piece, including free (the free in freemium) categories. Service application framework objects are small and must be loaded once per application per URL (if intended and if the web client supports object caching). Objects held in "app marketplace" for public access to software applications including web site templates and components when used are instantiated to a unique URL that is billable to the user of that object with a premium paid to the licensor (usually the author) on an ongoing basis as long as use persists. The business model is based on opt-in for cost balancing advertisement with web sites and software applications where the application runtime environment and framework owner takes a premium from all money exchanges. Software applications and software application components hosted by non-application runtime environment and framework application runtime environment and framework (native) applications and as components of web sites can still be billable this way.

In an alternative illustrative embodiment, rather than running in the ADOBE® FLASH® Player, the technology and schema described in embodiment A is supported natively in all major web browsers (and would preferably be adopted by the industry as a supported web standard) as a native web software application, thus not requiring a third party plugin (the plugin in embodiment A is ADOBE® FLASH® but the invention itself could also be produced as a plugin) or load of files required by the runtime over the Internet. The invention supports the embedding of platform-native software applications within browser-embedded software application configurations in the spirit of the GOOGLE® Native Client project. Further, the invention supports the packaging of platform-native software applications for all major operating systems thus implementing software applications similar to the use of the ADOBE® AIR® runtime in embodiment A.

In the background art, proven technologies (e.g., HAXE) for porting FLASH® AS3 projects to C++ and JAVASCRIPT® languages exist and are free. In this regard, the implementation of this embodiment (besides the aspects requiring that the invention be accepted as a web standard) are possible today provided the resources are available. Projects such as Alchemy (interface to high performance LUA language within ADOBE® FLASH® Player), in addition to the continued performance improvement to all relative Internet technologies promise to be strong allies to application runtime environment and framework performance and adoption.

In an illustrative embodiment, E object xml is used in examples and diagrams that are presented in FIGS. 9A-9F.

Referring to FIG. 10, an illustrative embodiment of the invention is presented. The 'a' characters next to numbers, such as "a4" for example, represent a component of the asynchronous processing that goes on as these objects are building themselves and communicating with each other.

Figure 11A:
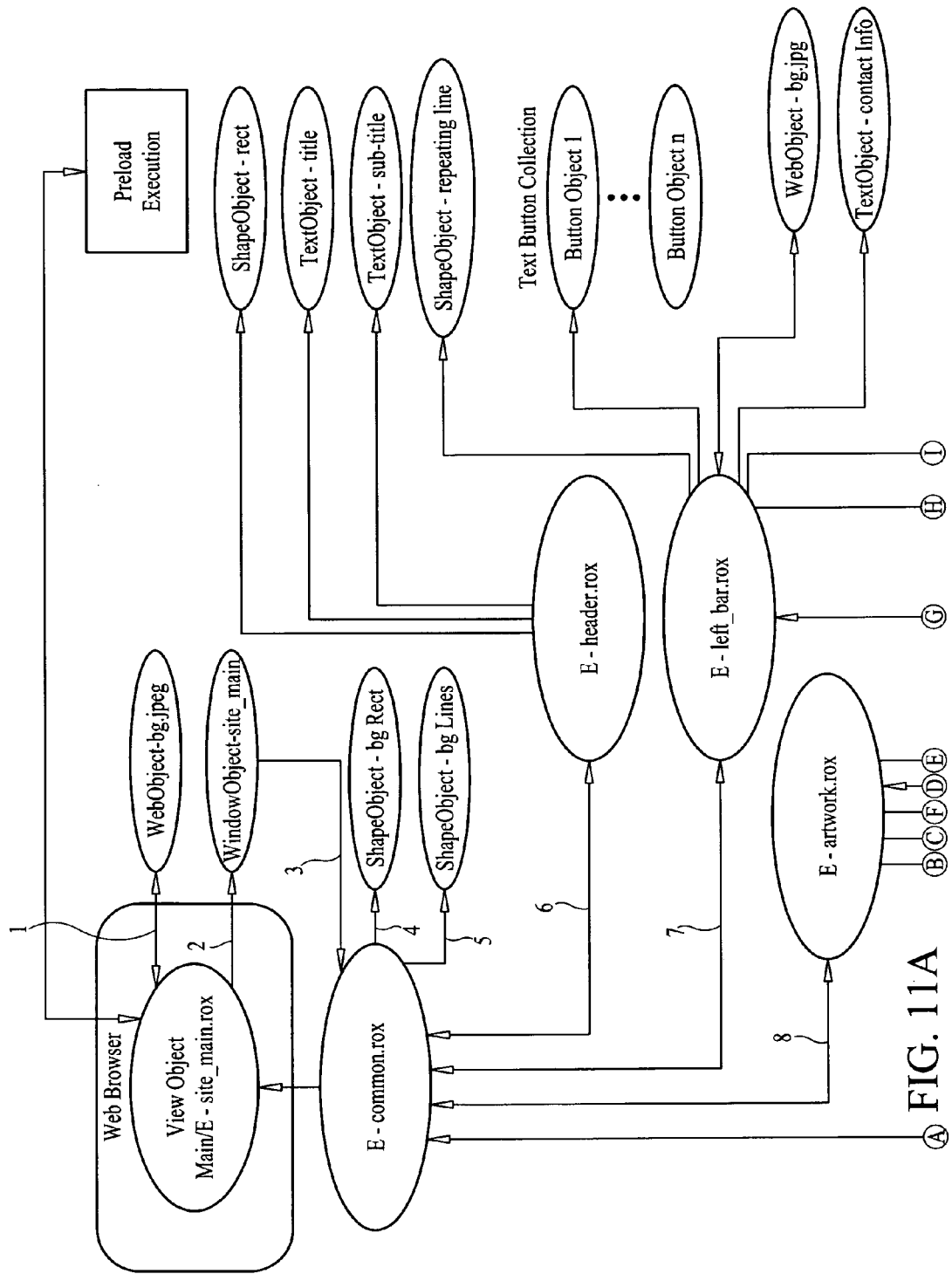
FIGS. 11A and 11B comprise a schematic process flow diagram that presents an illustrative embodiment of the invention in terms of object instantiation.
Figure 11B:
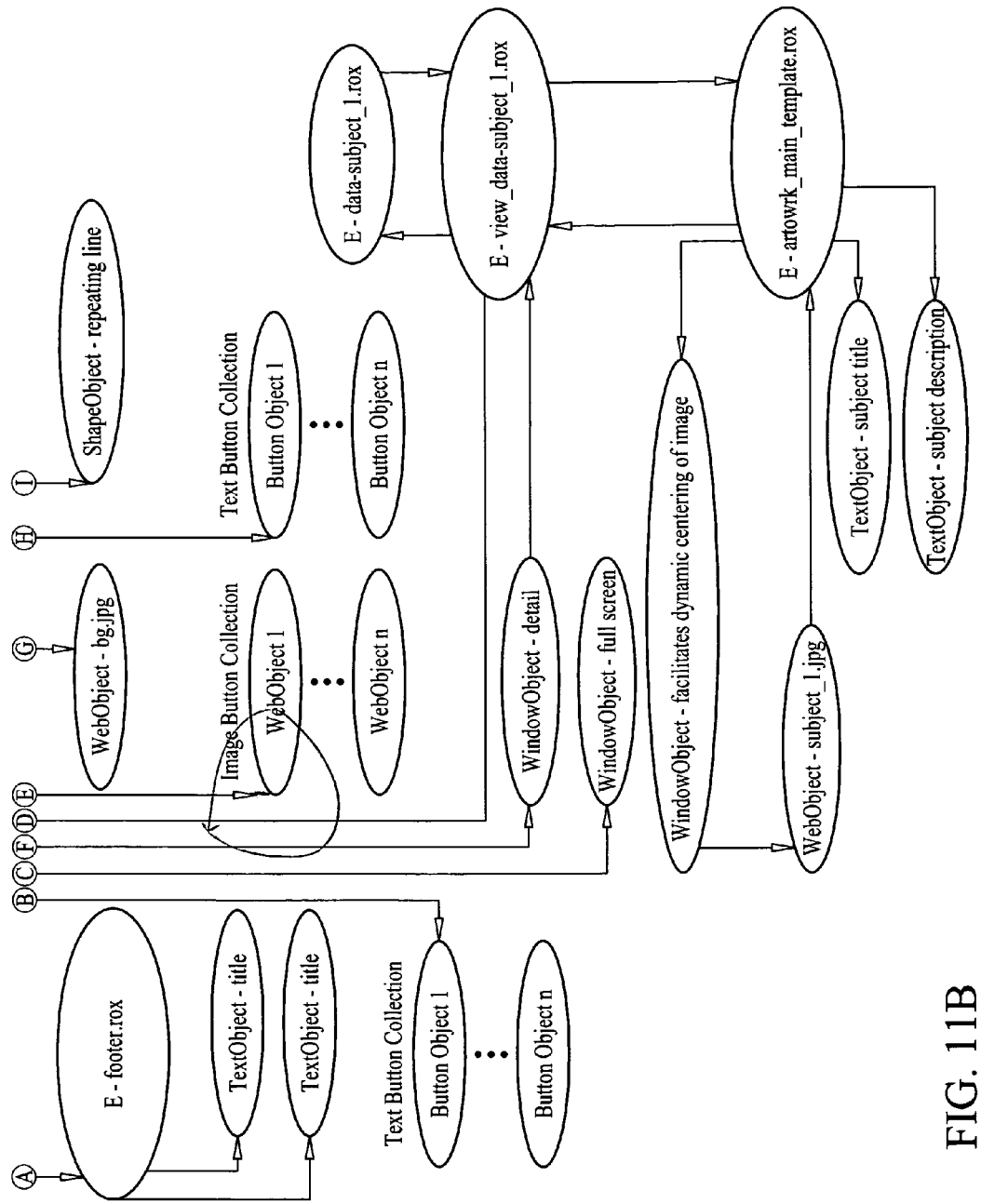

Referring to FIGS. 11A and 11B, an illustrative embodiment of the invention is presented. In this example, a button click results in loading and displaying as follows:
1—image button is clicked
2—data for this instance re-populated by iterating down through parents until data reached and populated
3—link message sent to root object where root checked first then if not there sequentially call children for recursive calls until a window object is reached with link window id
4—once window encountered it is checked that it is not already containing object with this id and if not it kicks off the changing of the object displayed in this window
5—window object uses configured transition algorithm (per window object) to switch display to new object
6—if new object is already being displayed elsewhere that object's current parent window is switched out with an internal "blank" object so that the object can be displayed elsewhere
7—otherwise if new object is not instantiated yet it is instantiated in the E object owning the window for display
8—object is added to linked to window object and displayed appropriately Many variations of the invention will occur to those skilled in the art. All such variations are intended to be within the scope and spirit of the invention.

Although some embodiments are shown to include certain features or steps, the applicant specifically contemplates that any feature or step disclosed herein may be used together or in combination with any other feature or step on any embodiment of the invention. It is also contemplated that any feature or step may be specifically excluded from any embodiment of the invention.

What is claimed is:

1. A method for configuring a software application, said method comprising:
   on a computing device having a processor and a memory, running a runtime environment and an application framework within a browser plugin or as a browser plugin, or running a native application executing said runtime environment and said application framework, or running said runtime environment and said application framework as a computer operating system;
   wherein said application framework comprises a plurality of compiled application objects, said compiled application objects being configurable by means of a Plurality of markup language configuration files, each of said markup language configuration files adhering to a schema and representing a display object container, and said runtime environment comprises a platform that is operative to support the software application running within it;
   accepting a user input modifying said markup language configuration files and saving said markup language configuration files to said memory, said markup language configuration files containing a representation of the state of the software application;
   processing in said processor said extensible markup language configuration files in accordance with a display object tree to produce the software application; and
   executing the software application within said runtime environment.

2. A method for configuring a runtime environment to run a configurable and interactive software application on a computing device having a processor, a memory, a screen, and a user input device, said method comprising:
   accepting a first user input to the user input device, said first user input creating a configurable set of extensible markup language application configuration files based on a first defined schema, or accepting another user input to the user input device creating a configurable set of JAVASCRIPT® Object Notation application configuration files based on a second defined schema;
   processing one of said configurable sets of application configuration files with said processor to a configurable location in said memory, said one of said configurable sets of application configuration files containing a representation of the state of the pages and components of the configurable and interactive software application; and
   instantiating the configurable and interactive software application;
   wherein processing said one of said configurable sets of application configuration files comprises processing a display object tree comprising a plurality of display object containers with each display object container represented by a single application configuration file following one of said defined schemas.

3. The method of claim 2 wherein at least one of said application configuration files comprises at least one display object container text file that references another display object container file.

4. A tangible computer-readable medium having computer executable instructions for performing a method comprising:
   running a runtime environment and framework within a player or a browser operating on a personal computer having a processor and a memory;
   accepting user input to said personal computer modifying an extensible markup language application configuration file based on a defined schema that is resident in said memory, said extensible markup language configuration file containing a representation of the state of a software application comprising an application page;
   processing said extensible markup language application configuration file within said runtime environment and framework in accordance with a display object tree comprising a plurality of display object containers with each display object container represented by a single application configuration file following said defined schema to produce said software application; and
   executing said software application within said runtime environment.

5. A system for configuring and executing a software application, said system comprising:
   a client computer comprising a processor; and
   a server;
   wherein said processor is programmed to enable a user to configure the software application by modifying, in accordance with a schema, a set of configuration files containing extensible markup language lists, each of said extensible markup language lists comprising a plurality of display object references that are processed by said processor in accordance with a display object tree comprising a plurality of display object containers with each display object container represented by a single application configuration file following said schema to configure a plurality of component objects to produce a plurality of configured component objects; and
   wherein said server is operative to download said plurality of configured component objects into another computing device, thereby allowing execution of the software application on said other computing device.

6. A system for configuring and running a software application, said system comprising:
   a computing device having a processor, a memory, an operating system, and a display, said computing device being programmed to provide a runtime environment and an application framework for the software application, said runtime environment and application framework comprising:
   a plurality of asynchronously-loaded, compiled application objects, said asynchronously-loaded, compiled application objects being configurable by means of a plurality of markup language configuration files, each of said markup language configuration files adhering to a schema and representing a display object container; and
   a running application that is operative to support the software application running within it;
   means for accepting a user input modifying said markup language configuration files and saving said markup language configuration files to said memory, said markup language configuration files containing a representation of the state of the software application; and
   means for processing in said processor said markup language configuration files in accordance with a display object tree to produce the software application.

7. The system of claim 6 wherein each said asynchronously-loaded, complied application object is downloaded from a server.

8. The system of claim 6 wherein at least one of said display object containers has a child display object container.

9. The system of claim 6 wherein each said markup language configuration file comprises: a plurality of display object and display object container references in z-order, or a plurality of instructions for branches of said display object tree data structure to transition to an existing or a newly created branch of said display object tree data structure, or a plurality of data collection references in the form of individual static files containing name/value pair collections of variables for persistence to said memory for retrieval during instantiation and processing of said asynchronously-loaded, compiled application objects, or a plurality of indications to preload said asynchronously-loaded, compiled application objects and configuration files before they are encountered in processing, or a combination thereof.

10. A system for configuring and running an interactive software application, said system comprising:
   a computing device having a processor, a user input device, a memory, a display, and an operating system, said computing device being programmed to provide an application framework and a runtime environment:
      said application framework comprising a plurality of compiled application objects, said compiled application objects being configurable by means of a plurality of markup language configuration files authored by a user using said user input device, each of said markup language configuration files adhering to a schema and representing a display object container; and
      said runtime environment comprising a running application that is operative to support the interactive software application running within it;
   means for accepting an input from said user modifying said markup language configuration files and saving said markup language configuration files to said memory, said markup language configuration files containing a representation of the state of the interactive software application; and
   means for processing in said processor said markup language configuration files in accordance with a display object tree data structure to produce the interactive software application.

11. The system of claim 10 wherein said markup language configuration files are extensible markup language configuration files.

12. The system of claim 10 wherein each compiled application object is a display object or one of said display object containers.

13. The system of claim 10 wherein at least one of said markup language configuration files references one or more other markup language configuration files or contains an embedded list of data fields in the form of name/value pairs.

14. The system of claim 12 wherein at least some of said markup language configuration files includes a list of display object configurations and display object container configurations in z-order in a top down manner, thereby causing each of said display objects or said display object containers configured at the top of said list to be displayed on said display over the top of each of said display objects or said display object containers that are configured lower in said list.

15. The system of claim 14 wherein dynamically-sized display objects are configured to automatically scale to have dimensions appropriate to be displayed on said display with a specific, configured, display object or in a specific, configured, display object container.

16. The system of claim 13 wherein said embedded list is embedded within one of said markup language configuration files or is referenced as a separate configuration file, thereby enabling said name/value pairs to be referenced at runtime by said application framework, overriding previous values of said name/value pairs then currently within said memory during processing of said markup language configuration files in a top-down manner.

17. The system of claim 16 wherein said application framework is operative to perform top down processing of said display object container configuration files and allow data configurations to be used in combinations of display object configurations and display object container configurations that reference dynamically-obtained data, thereby providing template-like functionality within said application framework.

18. The system of claim 10 wherein said application framework is operative to iterate through said application display object tree at runtime to send event messages to said display object containers acting as event handlers.

19. The system of claim 10 wherein said application framework is operative to reference markup language configuration files on initial page load, said markup language configuration files being loaded at that time if not loaded previously, or upon input to said application framework by said user.

20. The system of claim 10 wherein said application framework is operative to place into said memory additional markup language configuration files referenced within said markup language configuration files for immediate or future use.

21. The system of claim 10 wherein said application framework is operative to iterate through said display object tree data structure at runtime, starting at a root of said display object tree, when said application framework processes an event.

22. The system of claim 10 wherein said application framework and said runtime environment are downloaded as a versioned instance from a cloud file-hosting service.

23. The system of claim 10 wherein said application framework is operative to obtain at least one of said markup language configuration files from a server that does not perform server-side processing of said at least one of said markup language configuration files other than serving said at least one of said markup language configuration files.

24. A method for configuring and running an interactive software application utilizing an extensible markup language-driven runtime environment and framework, said method comprising:
   downloading from a cloud file-hosting service a versioned instance of the extensible markup language-driven runtime environment and framework to a computing device;
   configuring the interactive software application by accepting a user input modifying a configurable set of extensible markup language files in accordance with a schema, said configurable set of extensible markup language files including a plurality of lists organized in accordance with a display object tree and representing the interactive software application, each of said lists comprising a plurality of display object references, display object container references, and data record references in z-order configuring a plurality of component objects to produce a plurality of configured component objects capable of being loaded into said computing device on demand; and
   running the interactive software application by loading said configured component objects into said computing device and instantiating said configured component objects.

25. The method of claim 24 further comprising:
   uploading said plurality of configured component objects into said cloud file-hosting service and running on another computing device the interactive software application using configuration files hosted by said cloud file-hosting service, thereby making said plurality of configured component objects available for other users to use.

26. A method of configuring and running a software application, said method comprising:
- executing an application comprising a runtime environment and framework having an application stage on a computer having a processor, a memory, and a user interface device;
- creating a set of extensible markup language configuration files for configuring the software application and storing said set of configuration files in said memory, said set of extensible markup language configuration files comprising a representation of the software application;
- instantiating a plurality of application classes that are configured by means of said set of extensible markup language configuration files that are processed by said processor in accordance with a display object tree to produce a plurality of software application components;
- loading said software application components into said memory;
- instantiating a root object for processing of said set of extensible markup language configuration files in accordance with said display object tree;
- displaying the software application within said application stage; and
- accepting a user interaction with the software application.

27. The method of claim 26, said method further comprising:
- accepting an input from said user indicating that said user wishes to add a plurality of user interface components that are derived from said runtime environment and framework or that are accessible by running a native application on said computer as part of the software application;
- prompting said user and accepting another input from said user in an extensible markup language format of a plurality of configuration values for each of said user interface components, thereby adding more extensible markup language configuration files to said set of extensible markup language configuration files;
- saving said plurality of configuration values to said memory;
- re-evaluating a plurality of dependencies of the software application;
- re-loading said dependencies and reloading said plurality of software application components;
- re-instantiating a root object for processing of said set of extensible markup language configuration files in accordance with said display object tree;
- re-displaying the software application within said application stage.

28. A system for configuring and running a software application, said system comprising:
- a client computer comprising a processor and a memory;
- a server;
- wherein said server is operative to download a versioned instance of a runtime environment and framework for instantiation in combination with a plurality of application configuration extensible markup language files into said client computer;
- wherein said client computer is operative to accept a user input modifying a plurality of lists situated within said extensible markup language files representing individual display object containers that make up the software application, said lists comprising a plurality of display object references in z-order that are processed by said processor in accordance with a display object tree, thereby configuring a plurality of component objects to produce a plurality of configured component objects that are uploadable to said server; and
- wherein said server is operative to download said configured component objects into said client computer on demand.

\* \* \* \* \*